US007363400B2

(12) United States Patent
Tanaka et al.

(10) Patent No.: US 7,363,400 B2
(45) Date of Patent: Apr. 22, 2008

(54) DATA TRANSFER SWITCH

(75) Inventors: Katsuya Tanaka, Tokyo (JP); Tetsuya Shirogane, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 310 days.

(21) Appl. No.: 10/847,881

(22) Filed: May 19, 2004

(65) Prior Publication Data
US 2005/0210171 A1 Sep. 22, 2005

(30) Foreign Application Priority Data
Mar. 22, 2004 (JP) ............................. 2004-082190

(51) Int. Cl.
*G06F 3/00* (2006.01)
(52) U.S. Cl. ...................... 710/56; 710/52; 710/310; 710/317; 709/234
(58) Field of Classification Search ................. 710/52, 710/310, 317, 56; 370/395.72; 709/234
See application file for complete search history.

(56) References Cited

U.S. PATENT DOCUMENTS

| 4,082,922 | A | * | 4/1978 | Chu ........................... 370/230 |
| 4,701,856 | A | * | 10/1987 | DiGiulio et al. ............ 705/405 |
| 5,574,933 | A | * | 11/1996 | Horst ........................... 712/28 |
| 5,636,210 | A | * | 6/1997 | Agrawal ...................... 370/390 |
| 5,822,618 | A | * | 10/1998 | Ecclesine ..................... 710/57 |
| 6,160,813 | A |   | 12/2000 | Banks et al. |
| 6,317,427 | B1 | * | 11/2001 | Augusta et al. ............. 370/357 |
| 6,351,780 | B1 | * | 2/2002 | Ecclesine ..................... 710/22 |
| 6,490,213 | B1 | * | 12/2002 | Mu et al. ..................... 365/208 |
| 6,542,954 | B1 | * | 4/2003 | Aruga ........................ 710/316 |
| 6,731,646 | B1 |   | 5/2004 | Banks et al. |
| 6,751,704 | B2 | * | 6/2004 | Ng .............................. 711/120 |
| 6,792,506 | B2 |   | 9/2004 | Solomon et al. |
| 6,850,998 | B2 |   | 2/2005 | Inoue et al. |
| 2003/0026206 | A1 |   | 2/2003 | Mullendore et al. |
| 2003/0117958 | A1 | * | 6/2003 | Nation et al. ............... 370/235 |
| 2003/0191891 | A1 |   | 10/2003 | Tanaka et al. |
| 2005/0108476 | A1 |   | 5/2005 | Tanaka et al. |

OTHER PUBLICATIONS

IBM Corporation. RAM-Based Packet Switch With Overflow Buffers. Jan. 1, 1990. IBM Technical Disclosure Bulletin.*
Kuwahara et al. A shared buffer memory switch for an ATM exchange. IEEE. 1989.*
Singhal et al. High-Speed Buffered Crossbar Switch Design Using Virtex-EM Devices. XILINX Application Note. Mar. 14, 2000.*
Katevenis et al. Variable Packet Size Buffered Crossbar (CICQ) Switches. IEEE Communications Society. 2004.*

* cited by examiner

*Primary Examiner*—Mark H. Rinehart
*Assistant Examiner*—Matthew D Spittle
(74) *Attorney, Agent, or Firm*—Mattingly, Stanger, Malur & Brundidge, P.C.

(57) ABSTRACT

When the capacity availability of buffer memory provided to an output port of a frame to be transferred is exceeding a predetermined value, a crossbar switch is used for path change of the frame. When the capacity availability of the buffer memory of the output port is the predetermined value or lower, the frame is written into shared memory. Then, the frame is read from the shared memory for transfer to the output port. By selectively performing frame transfer using the crossbar switch and frame transfer via the shared memory, the effects can be reduced even if the port buffer overflows, and the writing throughput can be favorably improved.

13 Claims, 17 Drawing Sheets

FIG. 17

| WORD | | | | |
|---|---|---|---|---|
| | SOFi3 | | | |
| 0 | R_CTL[06] | D_ID | | |
| 1 | CS_CTL | S_IS | | |
| 2 | TYPE | F_CTL | | |
| 3 | SEQ_ID | DF_CTL | SEQ_CNT | |
| 4 | OX_ID | | RX_ID | |
| 5 | [00 00 00 00] | | | |
| 6 | LUN | | | |
| 7 | | | | |
| 8 | (TASK MANAGEMENT FLAG, ETC.) | | | |
| 9 | CDB BYTE 0 | CDB BYTE 1 | CDB BYTE 2 | CDB BYTE 3 |
| 10 | CDB BYTE 4 | CDB BYTE 5 | CDB BYTE 6 | CDB BYTE 7 |
| 11 | CDB BYTE 8 | CDB BYTE 9 | CDB BYTE 10 | CDB BYTE 11 |
| 12 | CDB BYTE 12 | CDB BYTE 13 | CDB BYTE 14 | CDB BYTE 15 |
| 13 | FCP_DL | | | |
| | CRC | | | |
| | EOFt | | | |

FIG. 18

| WORD | | | |
|---|---|---|---|
| | SOFi3 | | |
| 0 | R_CTL[01] | D_ID | |
| 1 | CS_CTL | S_IS | |
| 2 | TYPE | F_CTL | |
| 3 | SEQ_ID | DF_CTL | SEQ_CNT |
| 4 | OX_ID | | RX_ID |
| 5 | RELATIVE OFFSET | | |
| 6 | | | |
| ... | DATA PAYLOAD | | |
| N-1 | | | |
| | CRC | | |
| | EOFt | | |

| | OX_ID | S_ID | D_ID |
|---|---|---|---|
| 0 | 0x02E3 | 0x010001 | 0x0114C6 |
| 1 | 0x02E4 | 0x010001 | 0x0114C7 |
| 2 | 0x02E5 | 0x010001 | 0x0114C8 |
| 3 | 0x02E6 | 0x010001 | 0x0114C9 |
| 4 | 0x02E7 | 0x010001 | 0x0114CA |
| 5 | 0x02E8 | 0x010001 | 0x0114CB |
| 6 | 0x02E9 | 0x010001 | 0x0114CC |
| 7 | 0x02EA | 0x010001 | 0x0114CD |
| · | | | |
| · | | | |
| · | | | |
| · | | | |
| · | | | |
| · | | | |
| · | | | |

1901

DATA TRANSFER SWITCH

CROSS-REFERENCES TO RELATED APPLICATIONS

This application relates to and claims priority from Japanese Patent Application No. 2004-082190, filed on Mar. 22, 2004, the entire disclosure of which is incorporated herein by reference.

BACKGROUND OF THE INVENTION

1. Field of the Invention

The present invention relates to data transfer switches, specifically to a switch for use in a secondary storage device of a computer system and, more specifically, to a switch for connection between a disk controller and a disk array, and a data transfer control method using the switch.

2. Description of the Related Art

A computer system performs data reading and writing whenever necessary from a host system exemplified by a CPU (Central Processing Unit) using a secondary storage device of a large capacity provided therein for storage of data required by the host system. The secondary storage device is often a nonvolatile storage medium, popularly, a disk device exemplified by a magnetic disk drive, an optical disk drive, and others.

In recent years, such a secondary storage device has been expected to be better in performance with the current movement toward the information-oriented society. To meet such expectations, preferably, the more number of disk drives are to be connected, and the throughput is to be enhanced. As a responsive solution, so far proposed is to establish a connection between a disk controller and a disk array in a storage device using a switch. In any high-performance storage devices, a Fibre Channel is a popular option as an input/output interface between the disk controller and the disk array.

As an example, U.S. Pat. No. 6,160,813 A1 discloses a Fibre Channel switch applicable for connection establishment between a disk controller and a disk array in a storage device. The disclosed switch is of a shared memory type, with which incoming and outgoing frames from/to every switch port share the same central memory.

As another example, U.S. 2003/191891 A1 discloses a storage device using a switch with buffer memory for connection between a disk controller and a disk array therein. More specifically, a plurality of switches SW1 to SW4 are used to connect between a disk adapter DKA and a disk array DA, which is structured by a plurality of disk groups R1 to R4. The switches are in charge of switching between a port connected with the disk adapter and a port connected with a disk drive for every incoming frame. Such switching is performed in accordance with destination information in each corresponding frame.

SUMMARY OF THE INVENTION

With the advance of network technology, the media speed per channel has been steadily increasing. The media speed in a Fibre channel used for a storage device is currently in a range from 1 Gb/s to 2 Gb/s, for example. In the near future, the media speed is expected to still increase, and the speed range will cover about 4 Gb/s to 10 Gb/s. The issue here is that the effective data transfer speed for data reading or writing from/to a disk drive is currently, at the maximum, about 100 MB/s. The data transfer speed may not increase as rapidly as the media speed might because the disk drive includes mechanical components.

With the topology disclosed in U.S. 2003/191891 A1, the disk drive is plurally connected to a single disk adapter via the switch. This means a single channel between the disk adapter and the switch has to aggregate data reading and writing from/to a plurality of disk drives. Such a connection results in throughput difference in the switch, between the throughput required by the disk-adapter-side channel and that required by the disk-array-side channel. Thus, the switch needs buffer memory for such difference absorption.

FIGS. 21 and 22 both show an exemplary exchange format using an FCP-SCSI (Fibre Channel Protocol for SCSI). Generally, an exchange format includes a sequence group, and a sequence includes one or more of a frame that goes through a series of operation. Referring to FIG. 21 showing an exemplary case of data reading, an initiator (disk controller) forwards a Read command (FCP_CMND) to a target (disk drive), and the target responsively forwards back to the initiator first reading data (FCP_DATA) and then status information (FCP_RSP). In such a manner, exchange is end.

Referring to FIG. 22 showing an exemplary case of data writing, on the other hand, the initiator forwards a Write command (FCP_CMND) to the target, and if required, the target forwards back to the initiator buffer control information (FCP_XFER_RDY). In response thereto, the initiator forwards writing data (FCP_DATA) to the target, and the target lastly forwards back to the initiator status information (FCP_RSP). In this manner, exchange is thus end.

Between the disk controller (initiator) and the disk drive (target), a data transfer sequence generally including successive frames is transmitted and received. At the time of data reading from a plurality of disk drives, even if the effective data transfer speed of the disk drives is slower than the media speed, the data transfer speed between the disk adapter and the switch can be easily increased in the following manner. That is, the media speed between the disk controller and the switch is first increased to a sufficient level. Then, a load balancing process such as round robin scheduling is so applied as to balance a load of the switch resulting from reading performed for a plurality of times. This is mainly done for exercising control over the buffer memory not to overflow.

Here, to enhance the throughput between the disk adapter and the disk array at the time of data writing to a plurality of disk drives, there needs to periodically change the frame destination on the disk controller side for every few frames not to overflow the buffer memory in the switch. This problematically complicates the process of exercising control for the purpose.

In this respect, the shared memory in the switch of U.S. Pat. No. 6,160,813 A1 operates as buffer memory, absorbing the speed difference between the disk-adapter-side channel and the disk-array-side channel. If this is the case, however, the shared memory is used both for the reading data and the writing data, thereby requiring the shared memory in the switch to be large in capacity. Further, the throughput of every port is all aggregated to the shared memory, whereby the shared memory needs to meet the high-speed throughput requirements. Still further, compared with a switch of a crossbar type, such a switch of the shared memory type problematically results in long latency for frames to pass the switch.

In the storage device of the above U.S. 2003/191891 A1, the throughput is enhanced between the disk adapter and the disk array through periodical change of a frame destination not to overflow the buffer memory in the switch port. If the switch remains not switched for a long time due to successive data writing to a drive connected to the same switch port, for example, the buffer memory resultantly overflows, and the writing throughput may be reduced. To prevent buffer memory overflow, every port has to have buffer memory of a large capacity.

In order to solve the above problems, the present invention is directed to a data transfer control method for performing data transfer between a first device and a second device using a switch with buffer memory that is provided correspondingly to a plurality of ports. In the method, a crossbar switch is used for path setting through selection either a first mode or a second mode. Specifically, in the first mode, data transfer is performed from an input port to an output port via the buffer memory, and in the second mode, data transfer is performed in such a manner as to write data from the input port into shared memory via the crossbar switch. Preferably, control is exercised for the crossbar switch to select the second mode based on the capacity availability of the buffer memory, so that the data written into the shared memory is read out for transfer to the output port via the crossbar switch.

Herein, desirably, the first device is a disk controller, and the second device is a disk array. At the time of data writing from the disk controller to the disk array, control is exercised in such a manner that the selection of the second mode becomes operative.

The present invention is directed also to a switch used for connection between a disk controller and a disk array for data transfer therebetween. This switch is preferably provided with buffer memory for temporary storage of data to be transferred between the disk controller and the disk array, a crossbar switch, shared memory, and a controller. Specifically, the buffer memory is the one provided correspondingly to a plurality of ports of the switch. The crossbar switch is used for path setting for data transfer through a connection with any specific port. The shared memory is connected to the crossbar switch for storage of data to be transferred. And the controller monitors the capacity availability of the buffer memory of the output port to which a frame is to be transferred. When the monitoring result tells that the capacity availability of the buffer memory is exceeding a predetermined value, the controller refers to destination information in the frame to have the crossbar switch performed path setting, and transfers the frame from the input port to the destined output port via the buffer memory. On the other hand, when the monitoring result tells that the capacity availability of the buffer memory is the predetermined value or lower, the controller performs frame writing from the input port to the shared memory via the crossbar switch. The controller also exercises control in such a manner as having the crossbar switch performed path setting based on the destination information in the frame for frame reading from the shared memory toward the output port via the crossbar switch.

In a preferred example, the controller determines whether or not the input port of the frame is a predetermined port. If determined as not, or if the monitoring result tells that the capacity availability of the buffer memory is exceeding the predetermined value, the controller performs frame transfer from the input port to the output port via the buffer memory. This frame transfer is done based on the destination information in the frame, and through path setting of the crossbar switch. On the other hand, if determined that the input port of the frame is the predetermined port, and if the monitoring result tells that the capacity availability of the buffer memory is the predetermined value or lower, the controller exercises control so that frame writing is done from the input port to the shared memory via the crossbar switch.

For the controller, the determination factor for the predetermined port is whether the port is belonging to the switch connected to the disk controller, for example.

In another preferred example, the controller also makes an identification of source information included in the frame, and based both on the identification result and the monitoring result, determines whether the capacity availability of the buffer memory is exceeding the predetermined value, or whether the source information is predetermined source information. When the capacity availability of the buffer memory is exceeding the predetermined value, or when the source information is not the predetermined source information, the controller has the crossbar switch performed path setting in accordance with the destination information in the frame so as to transfer the frame from the input port to the output port via the buffer memory. On the other hand, when determined that the capacity availability is the predetermined value or lower, and when the source information is the predetermined source information, the controller exercises control so that frame writing is done from the input port to the shared memory via the crossbar switch.

For the controller, the identification factor for the predetermined source information is whether the information is port identification information of the disk controller, for example.

In still another preferred example, the controller also makes a determination whether a command included in an exchange format of the frame is a predetermined command, and based both on the determination result and the monitoring result, determines whether the capacity availability of the buffer memory is exceeding the predetermined value, or whether the command in the exchange format is the predetermined command. When the capacity availability of the buffer memory is exceeding the predetermined value, or the command in the exchange format is not the predetermined command, the controller has the crossbar switch performed path setting in accordance with the destination information in the frame so as to transfer the frame from the input port to the output port via the buffer memory. On the other hand, when determined that the capacity availability is the predetermined value or lower, and when the command in the exchange format is the predetermined command, the controller exercises control so that frame writing is done from the input port to the shared memory via the crossbar switch.

For the controller, the determination factor for the predetermined command is whether the command is a writing command, for example.

The present invention is directed also to a storage device including the switch described above.

BRIEF DESCRIPTION OF THE DRAWINGS

FIG. 17 is a diagram showing an exemplary structure of a transfer frame in a Fibre Channel;

FIG. 18 is a diagram showing another exemplary structure of the transfer frame in the Fibre Channel;

DESCRIPTION OF THE PREFERRED EMBODIMENT

In the below, an embodiment of the present invention is described in detail by referring to the accompanying drawings.

Figure 1:
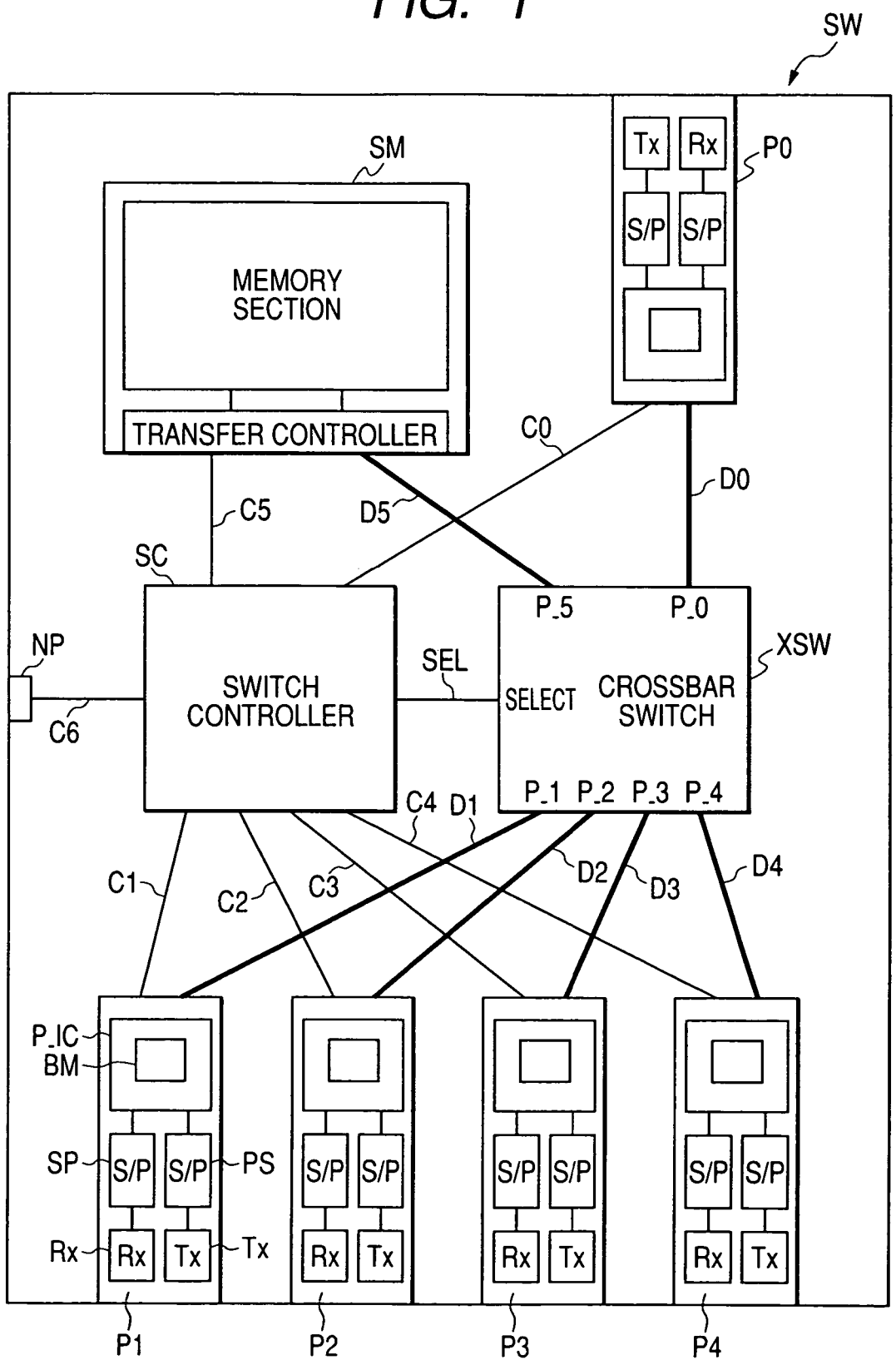
FIG. 1 is a diagram showing a switch of an embodiment.

FIG. 1 shows a switch SW of the embodiment, exemplarily having five ports of P0, P1, P2, P3, and P4. The switch SW is structured by a crossbar switch XSW, a switch controller SC, and shared memory SM. The ports P0 to P4 of the switch SW are connected to ports P_0 to P_4 of the crossbar switch XSW through signal lines D0 to D4, respectively. The shared memory SM is connected to a port P_5 of the crossbar switch XSW through a signal line D5. Further, the ports P0 to P4 of the switch SW are connected to the switch controller SC through signal lines C0 to C4, respectively. The shared memory SM is connected to the switch controller SC through a signal line C5. Moreover, the switch controller SC is connected to a port SELECT of the crossbar switch XSW through a signal line SEL. The switch controller SC is also connected to a port NP of the switch SW through a signal line C6.

Over the signal lines D0 to D5, frames and control signals come and go between the ports P0 to P4 and the shared memory SM. Similarly, over the signal lines C0 to C5, frame header information comes and goes among the ports P0 to P4, the shared memory SM, and the switch controller SC. The signal line SEL is used for a switching control signal coming and going between the switch controller SC to the crossbar switch XSW. The signal line C6 is used for setting information coming and going from/to outside of the switch. The setting information directed to the ports P0 to P4 and the shared memory SM is distributed from the switch controller SC over the signal lines C0 to C6.

Described now is the structure of the ports P0 to P4 of the switch SW by taking the port P1 as an example. The port P1 is structured by a receiver Rx, a transmitter Tx, a serial-to-parallel converter SP, a parallel-to-serial converter PS, and a protocol IC (Integrated Circuit) P_IC with buffer memory BM. Herein, the protocol IC P_IC is an integrated circuit with which an FC-1 layer and an FC-2 layer of the Fibre Channel are realized. A signal received by the receiver Rx is converted into a parallel signal in the serial-to-parallel converter SP, and the resulting parallel signal is then forwarded to the protocol IC P_IC. A signal output from the protocol IC P_IC is converted into a serial signal in the parallel-to-serial converter PS, and then the resulting serial signal is forwarded from the transmitter Tx to the outside of the switch SW.

Figure 2:
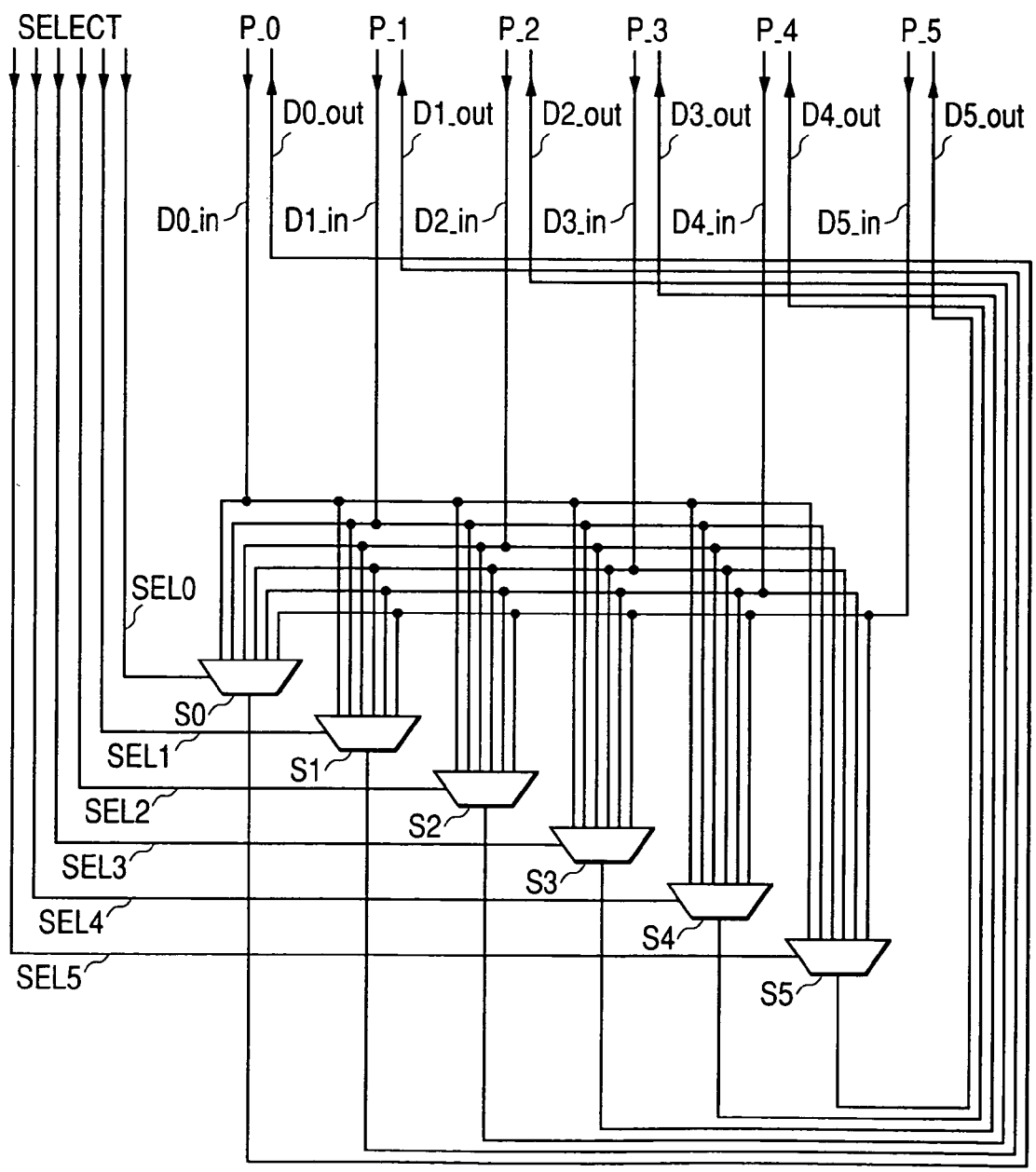
FIG. 2 is a diagram showing an exemplary structure of a crossbar switch XSW.

FIG. 2 is a diagram showing the structure of the crossbar switch XSW, having six selectors of S0, S1, S2, S3, S4, and S5. These selectors S0 to S5 are connected to the port SELECT through signal lines SEL0 to SEL5, respectively. The signal lines SEL0 to SEL5 are all connected to the signal line SEL of FIG. 1. The ports P_0 to P_5 of the crossbar switch XSW are capable of signal reception and transmission, and when any signal is received thereby, the signal is distributed to all of the selectors S0 to S5 via signal lines D0_in to D5_in. Outputs from the selectors S0 to S5 go to the ports P_0 to P_5 of the crossbar switch XSW via signal lines D0_out to D5_out, respectively. Through control over the selectors S0 to S5 by signals on the signal lines SEL0 to SEL5, realized is connection between any arbitrary ports by the crossbar switch XSW.

Figure 3:
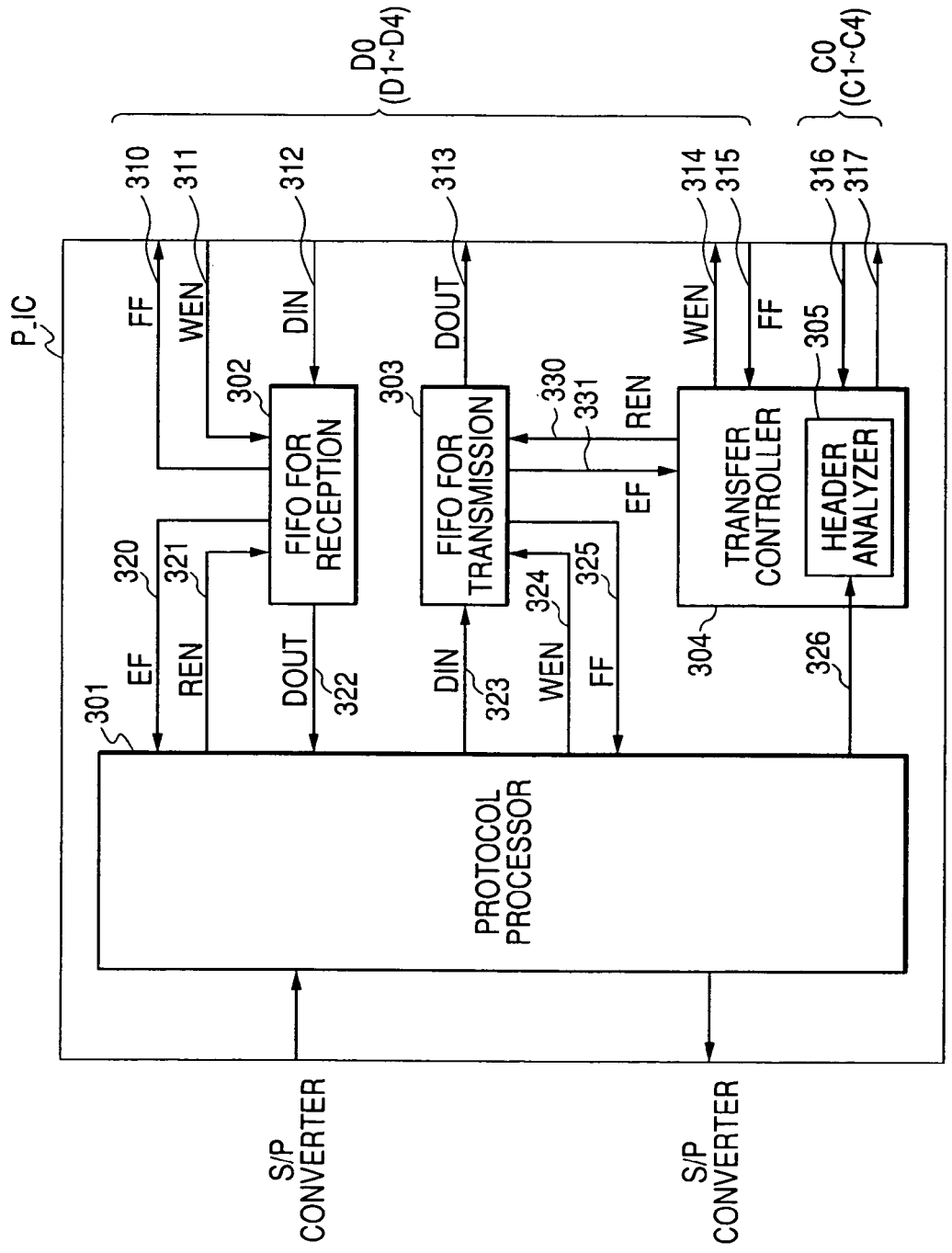
FIG. 3 is a diagram showing an exemplary structure of a protocol IC.

FIG. 3 is a diagram showing the structure of the protocol IC P_IC. The protocol IC P_IC is structured by a protocol processor 301, buffer memory for reception 302, buffer memory for transmission 303, and a transfer controller 304. The buffer memories 302 and 303 are both FIFO (First-IN First-Out) memories. The transfer controller 304 is provided with a header analyzer 305 for analyzing the header of a frame to be transferred between the switch ports. Signal lines 310, 311, 312, 313, 314, and 315 are all connected to the crossbar switch XSW, and equivalent to the signal lines D0 to D4 of FIG. 1. Signal lines 316 and 317 are connected to the switch controller SC, and equivalent to the signal lines C0 to C4 of FIG. 1.

The signal lines 310, 311, and 312 are for receiving a frame from any other ports. Specifically, the signal line 312 is the one for frame reception, and the signal line 311 is the one for receiving writing control signals. The signal line 310 is for notifying the buffer capacity availability, and when the capacity availability is larger than a predetermined value, the level thereof is "0". When the capacity availability is equal to or lower than the predetermined value, the level thereof is "1".

Signal lines 320, 321, and 322 are for the protocol processor 301 to read frames from the buffer memory 302. Specifically, the signal line 320 is for detecting whether any frame is received, and when the buffer has no frame left unread, the level thereof is "0". When the buffer has some frame left unread, the level thereof is "1". The signal line 322 is for transferring the received frame, and the signal line 321 is for receiving reading control signals.

Signal lines 323, 324, and 325 are for writing data from the protocol processor 301 to the buffer memory 303. Herein, the data is the one to be transmitted from the protocol processor 301 to any other ports. Specifically, the signal line 323 is for frame transferring, and the signal line 324 is for writing control signals. The signal line 325 is for notifying the buffer capacity availability, and when the capacity availability is larger than the predetermined value, the level thereof is "0". When the capacity availability is equal to or lower than the predetermined value, the level thereof is "1".

The transfer controller 304 receives header information about a transmitting frame from the protocol processor 301 over the signal line 326. Thus received header information is provided to the header analyzer 305. The header analyzer 305 extracts destination address information from the header of the transmitting frame, and thus extracted information is forwarded to the switch controller SC over the signal line 317. After receiving the destination address information, the switch controller SC sets a switching path for the crossbar switch XSW. Then, a switching completion notice is forwarded to the transfer controller 304 over the signal line 316. The signal line 316 is used also for receiving from the switch controller SC various setting information for every port.

The signal lines 313, 314, 315, 330, and 331 are used for frame transmission from the buffer memory 303 to any other ports. Specifically, the signal line 331 is for detecting any frame not yet transmitted, and when the buffer has no frame left untransmitted, the level thereof is "0". When the buffer has some frame left untransmitted, the level thereof is "1". The signal line 313 is for frame transmission to any other ports, and the signal line 330 is for reading control signals. After receiving the switching completion notice from the switch controller SC over the signal line 316, the transfer controller 304 checks, over the signal line 315, the capacity availability of the buffer memory of the output port to which the frame is transferred. Then, the writing control signal synchronized with the reading control signal on the signal line 330 is forwarded, over the signal line 314, to the buffer memory of the output port to which the frame is transferred. From the buffer memory for transmission 303, the frame synchronized with the reading control signal on the signal line 330 is transmitted over the signal line 313. Accordingly, the transmitting frame on the signal line 313 reach the output port in synchronization with the writing control signal on the signal line 314.

The signal line 310 is connected to the signal line 315 of any other protocol IC P_IC, the signal line 311 is connected to the signal line 314 of any other protocol IC P_IC, and the signal line 312 is connected to the signal line 313 of any other protocol IC P_IC, all via the crossbar switch XSW.

Figure 4:
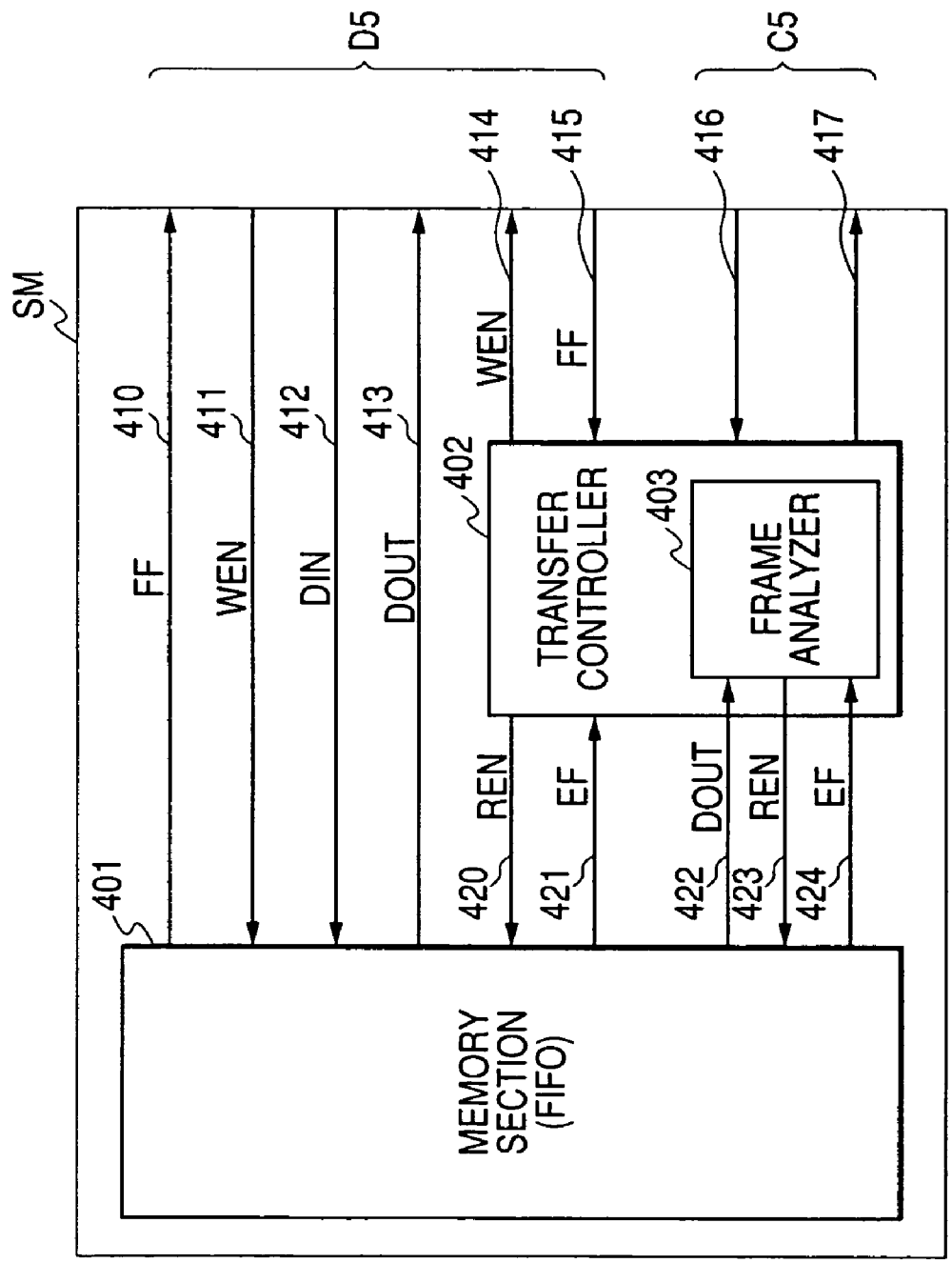
FIG. 4 is a diagram showing an exemplary structure of shared memory SM.

FIG. 4 is a diagram showing the structure of the shared memory SM. The shared memory SM is structured by a memory section 401 and a transfer controller 402. The memory section 401 is FIFO memory. The transfer controller 402 is provided with a frame analyzer 403. The frame analyzer 403 operates to extract destination address information through analysis of the header of a transmitting frame, and thus extracted information is forwarded to the switch controller SC over the signal line 417. The frame analyzer 403 also operates to manage the memory address range for frames stored in the memory section 401. After receiving the destination address information from the transfer controller 402 over the signal line 417, the switch controller SC sets a switching path for the crossbar witch XSW. Then, a switching completion notice is forwarded to the transfer controller 402 over the signal line 416. The signal line 416 is used also for receiving from the switch controller SC various setting information of the shared memory SM.

Signal lines 410, 411, 412, 413, 414, and 415 are each establishing a connection with the crossbar switch XSW, and equivalent to the signal line D5 of FIG. 1. Signal lines 416 and 417 are each establishing a connection with the switch controller SC, and equivalent to the signal line C5 of FIG. 1.

The signal lines 410, 411, and 412 are used for frame reception from the ports. Specifically, the signal line 412 is for frame reception, and the signal line 411 is for receiving writing control signals. The signal line 410 is for notifying the buffer capacity availability, and when the capacity availability is larger than the predetermined value, the level thereof is "0". When the capacity availability is equal to or lower than the predetermined value, the level thereof is "1".

The memory section 401 has two sets of reading signal lines. The first set is a combination of the signal lines 413, 420, and 421, and the second set is a combination of the signal lines 422, 423, and 424.

The first set of the signal lines 413, 420, and 421 are used by the transfer controller 402 for frame reading from the memory section 401. The signal line 421 is for detecting any frame not yet transmitted, and when the memory section 401 has no frame left untransmitted, the level thereof is "0". When the memory section 401 has some frame left untransmitted, the level thereof is "1". The signal line 413 is for frame transmission to the ports, and the signal line 420 is for reading control signals. The transfer controller 402 checks, over the signal line 415, the capacity availability of the buffer memory of the output port to which the frame is transferred. Then, the writing control signal synchronized with the reading control signal on the signal line 420 is forwarded to the output port over the signal line 414.

The second set of the signal lines 422, 423, and 424 are all used for frame reading by the frame analyzer 403 from the memory section 401. The signal line 424 is for detecting any frame not yet transmitted, and when the memory section 401 has no frame left untransmitted, the level thereof is "0". When the memory section 401 has some frame left untransmitted, the level thereof is "1". The signal line 422 is for frame transfer to the frame analyzer 403, and the signal line 423 is for reading control signals. Prior to frame transmission performed by the transfer controller 402, the frame analyzer 403 goes through header analysis of transmitting frames, detection of the memory address range on the memory section 401, and the like.

Figure 5:
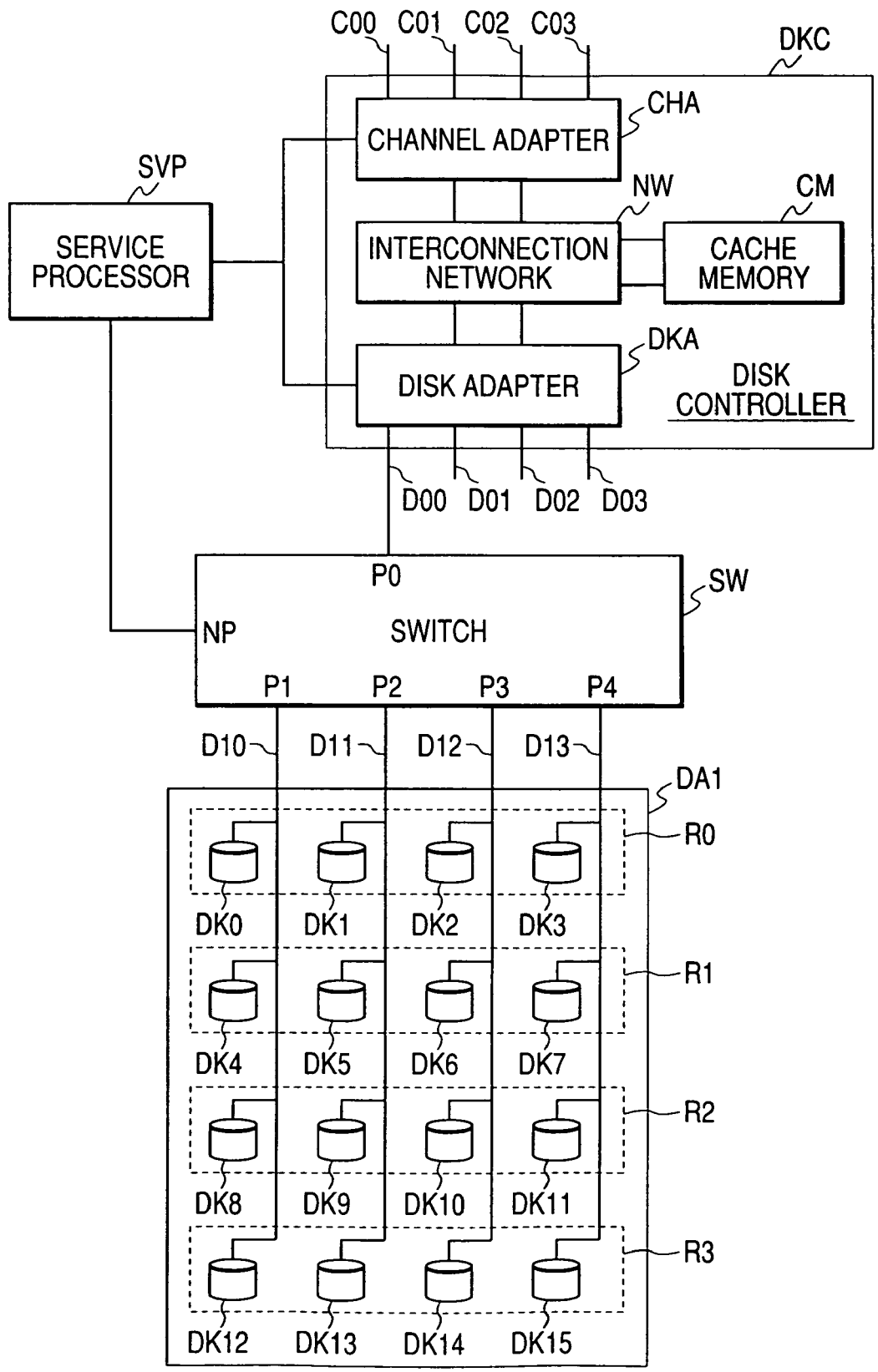
FIG. 5 is a diagram showing an exemplary storage device having applied with the switch of the embodiment.

Referring to FIG. 5, next described is the structure of a storage device having applied with the switch SW of the present embodiment.

The storage device is mainly structured by a disk controller DKC, a disk array DA1, and the switch SW. The disk controller DKC includes a channel adapter CHA, cache memory CM, and a disk adapter DKA. A connection is established among the channel adapter CHA, the cache memory CM, and the disk adapter DKA over an interconnection network NW. The channel adapter CHA is connected to a host system (not shown) exemplified by a host computer over channels C00, C01, C02, and C03. The disk adapter DKA is connected to the disk array DA1 via the channel D00 and the switch SW. Although the channels D01, D02, and D03 are connected to other disk arrays via the switch similarly to the channel D00, no description is given herein for brevity. The disk controller DKC and the switch SW can receive setting information from a service processor SVP.

Figure 6:
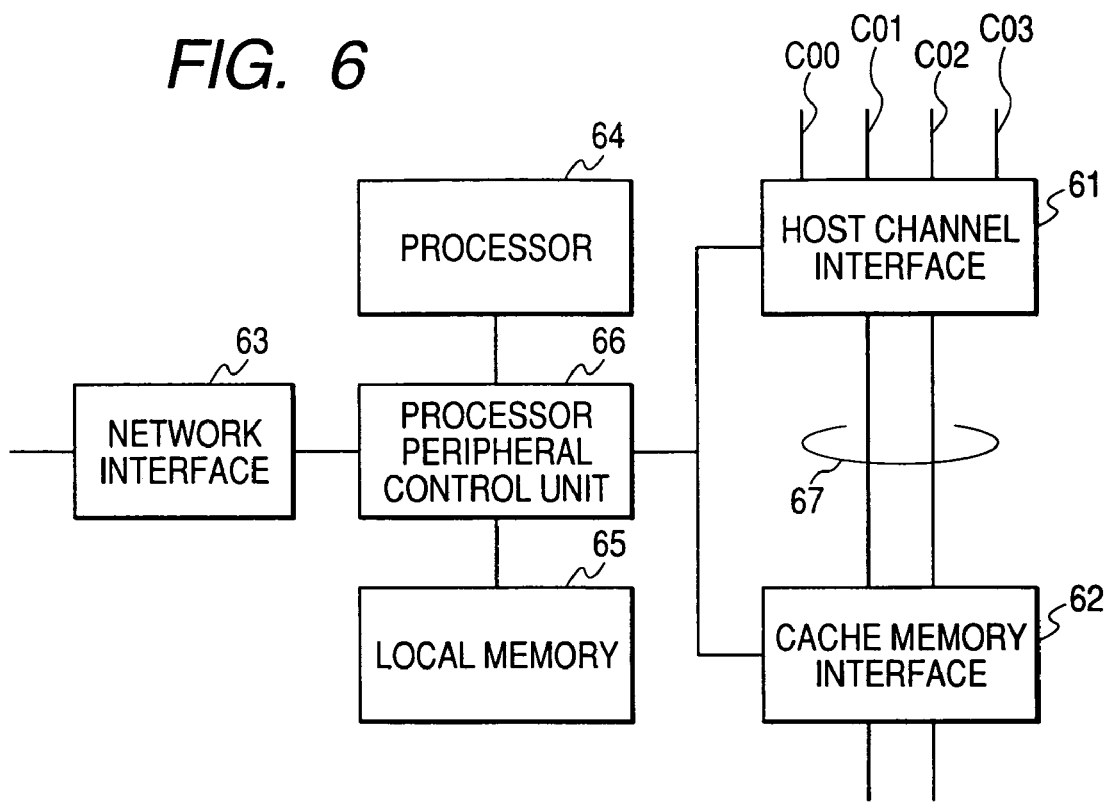
FIG. 6 is a diagram showing an exemplary structure of a channel adapter CHA.

Referring to FIG. 6, described now is the structure of the channel adapter CHA. The channel adapter CHA is structured by: a host channel interface 61 connected to the channels C00 to C03; a cache memory interface 62 connected to the interconnection network NW; a network interface 63 for establishing a connection with the service processor SVP; a processor 64 for controlling data transfer with the host system; local memory 65 storing various tables for reference by the processor 64 and software for execution thereby; and a processor peripheral control unit 66 for establishing an interconnection among the above components.

The service processor SVP operates to set or change the various tables for reference by the processor 64 and a processor 74 (will be described later), or is used for a monitor and others displaying the operation state of the storage device.

The host channel interface 61 has a conversion capability between the data transfer protocol on the channels C00 to C03 and the data transfer protocol inside of the disk controller. The host channel interface 61 and the cache memory interface 62 are connected to each other through a signal line 67.

Figure 7:
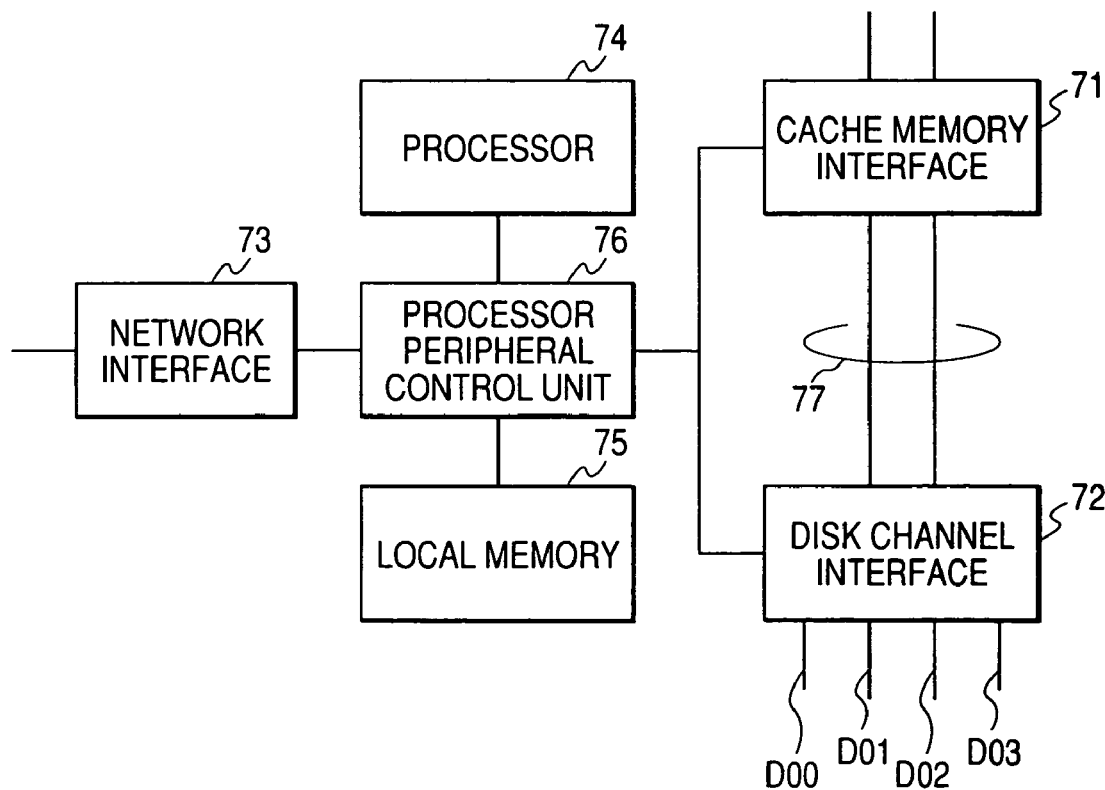
FIG. 7 is a diagram showing an exemplary structure of a disk adapter DKA.

Referring to FIG. 7, the structure of the disk adapter DKA is now described. The disk adapter DKA is structured by: a cache memory interface 71 connected to the interconnection network NW; a disk channel interface 72 connected to the disk channels D00 to D03; a network interface 73 for establishing a connection with the service processor SVP; the processor 74; local memory 75 storing various tables for reference by the processor 74 and software for execution thereby; and a processor peripheral control unit 76 for establishing an interconnection among the above components.

A connection is established between the cache memory interface 71 and the disk channel interface 72 by a signal line 77. The disk channel interface 72 has a conversion capability between the data transfer protocol inside of the disk controller and the data transfer protocol on the channels D00 to D03, e.g., between the FCP-SCSI.

Described next is the structure of the disk array DA1 of the present embodiment. The disk array DA1 of FIG. 5 is structured by: a disk array including four disk drives connected over a channel D10; a disk array including four disk drives connected over a channel D11; a disk array including four disk drives connected over a channel D12; and a disk array including four disk drives connected over a channel D13.

Exemplifying the channel D10, disk drives DK0, DK4, DK8, and DK12 are connected over the channel D10. For disk drive access by connecting a plurality of drives over a single channel as such, exemplified is Fibre Channel Arbitrated Loop (FC-AL). Here, reference characters R0, R1, R2, and R3 each denote a logical group of the disk drive.

The disk controller DKC is connected to the port P0 of the switch SW over the channel D00. In the disk array DA1, the channel D10 is connected to the port P1 of the switch SW, the channel D11 to the port P2 thereof, the channel D12 to the port P3 thereof, and the channel D13 to the port P4 thereof. The service processor SVP is connected to the port NP of the switch SW. Here, the media speed on the disk-controller-side channel D00 is preferably so set as to be affordable even if the channel D00 aggregates data transfer on the disk-array-side channels D10, D11, D12, and D13.

Figure 8:
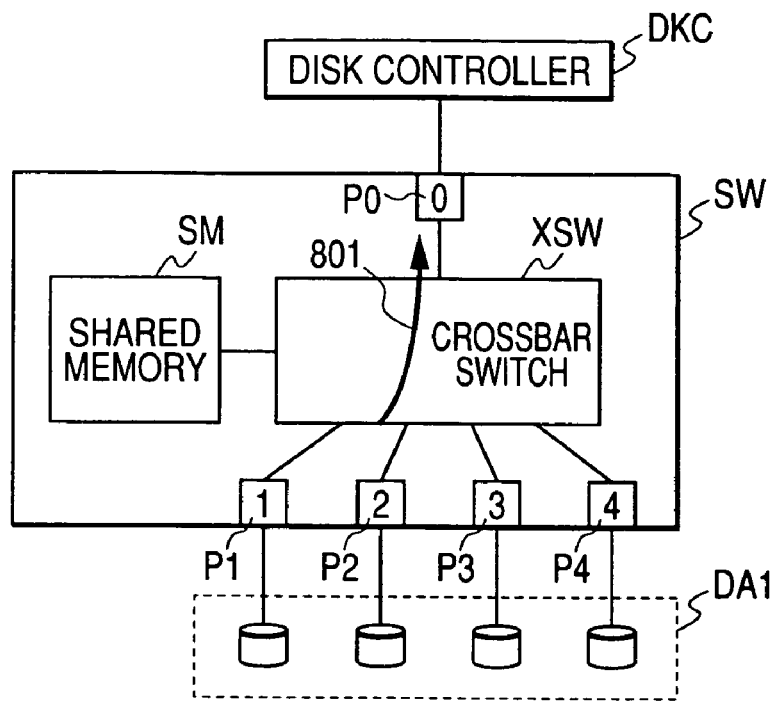
FIG. 8 is a diagram showing an exemplary operation of the switch of the embodiment.
Figure 9:
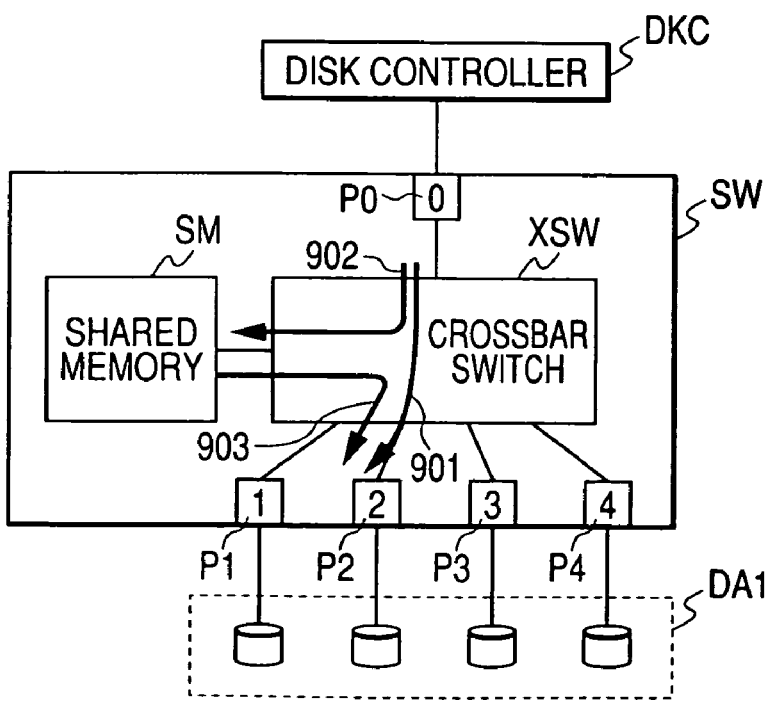
FIG. 9 is a diagram showing another exemplary operation of the switch of the embodiment.

Next, by referring to FIGS. 8 and 9, the operational characteristics of the switch of the present embodiment are described.

For the switch SW, through setting, two operation modes are available for selection on a frame input port basis. Specifically, in one operation mode (in the below, referred to as mode A), the internally-provided crossbar switch XSW is solely used for switching. In the other mode (mode B), both the crossbar switch XSW and the shared memory SM are used for switching. FIGS. 8 and 9 both show frame transfer between the port P0 connected to the disk controller DKC and the port P2 connected to the disk array DA1.

Specifically, FIG. 8 shows frame transfer from the disk array DA1 to the disk controller DKC, corresponding mainly to the reading operation of the controller DKC. On the other hand, FIG. 9 shows frame transfer from the disk controller DKC to the disk array DA1, corresponding mainly to the writing operation of the disk controller DKC.

Here, to the port P0, the operation mode (mode B) is so set as to perform switching with respect to frames incoming to the port P0 using both the crossbar switch XSW and the shared memory SM. The ports P1 to P4 are set in the operation mode (mode A) in which switching is performed with respect to incoming frames using only the crossbar switch XSW. Note here that such operation mode setting is settable and changeable by the service processor SVP.

As a result of such setting, as denoted by an arrow 801 of FIG. 8, on the way from the disk array DA1 to the disk controller DKC, frames pass through only the crossbar switch XSW. On the way from the disk controller DKC to the disk array DA1, on the other hand, the switch SW performs frame transfer only through the crossbar switch XSW as denoted by an arrow 901 of FIG. 9, and frame transfer through both the shared memory SM and the crossbar switch XSW as denoted by arrows 902 and 903 of FIG. 9.

Although details are left for later description, at the time of transfer from the disk controller DKC to the disk array DA1, the port P0 first goes through frame transfer (arrow 901) passing through only the crossbar switch XSW. Here, the execution throughput between the disk controller DKC and the port P0 of the switch SW is higher than that between the disk array DA1 and the ports P1 to P4. Thus, if with long transfer data size, the buffer memory in the port P2 will overflow.

When the capacity availability of the buffer memory in the port P2 reaches the predetermined value or lower, the port P0 changes the destination of frames to the shared memory SM (arrow 902). Responding to frame writing to the shared memory SM, separately from the frame transfer denoted by the arrow 902, another frame transfer (arrow 903) is started from the shared memory SM to the port P2. Assuming here is that, after the frame transfer denoted by the arrow 902 is completed, frame transfer is started from the port P0 to P3 as denoted by an arrow 2301 of FIG. 20. If this is the case, no competition is observed between the output ports. Thus, the frame transfer from the shared memory SM to the port P2 (arrow 2302) can be performed at the same time as the frame transfer from the port P0 to the port P3.

That is, with the switch of the present embodiment, when the buffer memory of the output port of the switch becomes very close to overflow, the frame to be transferred is written into the shared memory SM for once. Then, when the buffer memory becomes available in capacity, the frame is transferred from the shared memory SM to the output port. Through such operation, frame transfer toward different output ports can be performed at the same time as long as no competition is observed between output ports of the switch. Accordingly, such a structure decreases any effects of overflowing the output port buffer, thereby successfully increasing the transfer throughput from the disk controller DKC to the disk array DA1. As such, with the storage device having applied with the switch of the present embodiment, the throughput at the time of data writing can be effectively improved.

Figure 10:
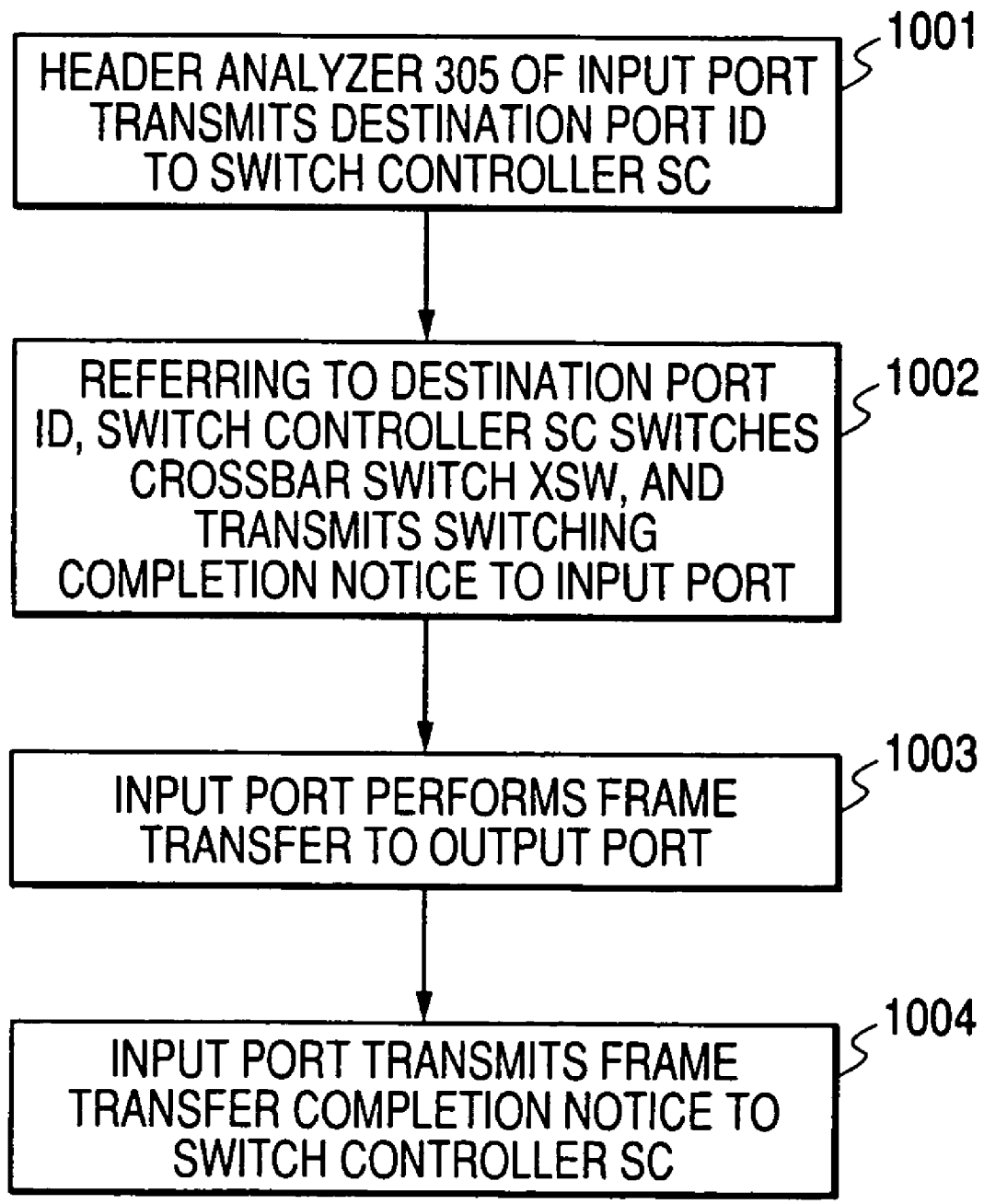
FIG. 10 is a diagram showing an exemplary control flow of the switch of the embodiment.

FIG. 10 shows a frame transfer flow for a port set in the operation mode A. First of all, the header analyzer 304 of the input port analyzes the header of a frame to be transferred, and thus derived destination address information (in the case of Fibre Channel, destination port ID) is forwarded to the switch controller SC (1001). Based on thus provided destination address information, the switch controller SC switches the crossbar switch XSW (1002). If any access conflict occurs between the output switch ports, arbitration is performed. Then, the switch controller SC forwards a switching completion notice of the crossbar switch XSW to the input port. Then, the input port performs frame transfer toward the output port (1003). Thereafter, the input port forwards a transfer completion notice to the switch controller SC (1004).

Figure 11:
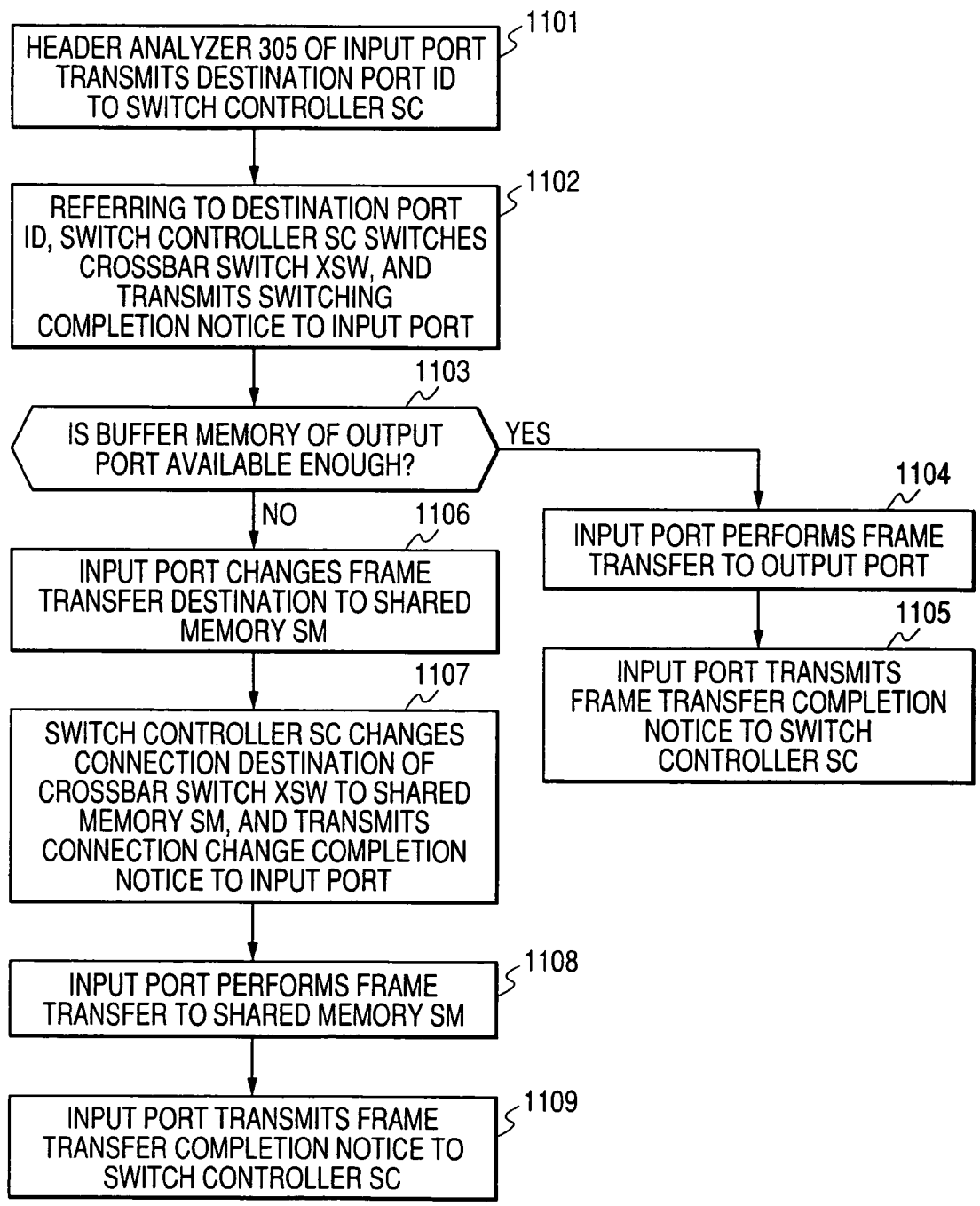
FIG. 11 is a diagram showing another exemplary control flow of the switch of the embodiment.

FIG. 11 shows a frame transfer flow for a port set in the operation mode B. First, the header analyzer 304 of the input port analyzes the header of a frame to be transferred, and thus derived destination address information (in the case of Fibre Channel, destination port ID) is forwarded to the switch controller SC (1101). Based on thus provided destination address information, the switch controller SC switches the crossbar switch XSW. If any access conflict occurs between the output switch ports, arbitration is performed. Then, the switch controller SC forwards a switching completion notice of the crossbar switch XSW to the input port (1102). Thereafter, the input port checks the capacity availability of the buffer memory BM of the output port that is the frame destination (1103). When the capacity availability is larger than a predetermined value, the procedure goes to step 1104, and when equal to or lower than the predetermined value, the procedure goes to step 1106.

When the capacity availability of the buffer memory BM is larger than the predetermined value, the input port performs frame transfer toward the output port (1104). Then, the input port forwards a transfer completion notice to the switch controller SC (1105).

On the other hand, when the capacity availability is equal to or lower than the predetermined value, the input port changes the frame destination to the shared memory SM (1106), and forwards to the switch controller SC a request for establishing a connection between the input port and the shared memory. In response to the request, the switch controller SC switches the crossbar switch XSW to connect together the input port and the shared memory SM. Thereafter, the switch controller SC forwards a switching completion notice to the input port (1107). The input port then performs frame transfer toward the shared memory SM (1108), and after completing the transfer, forwards a transfer completion notice to the switch controller SC (1109).

Figure 12:
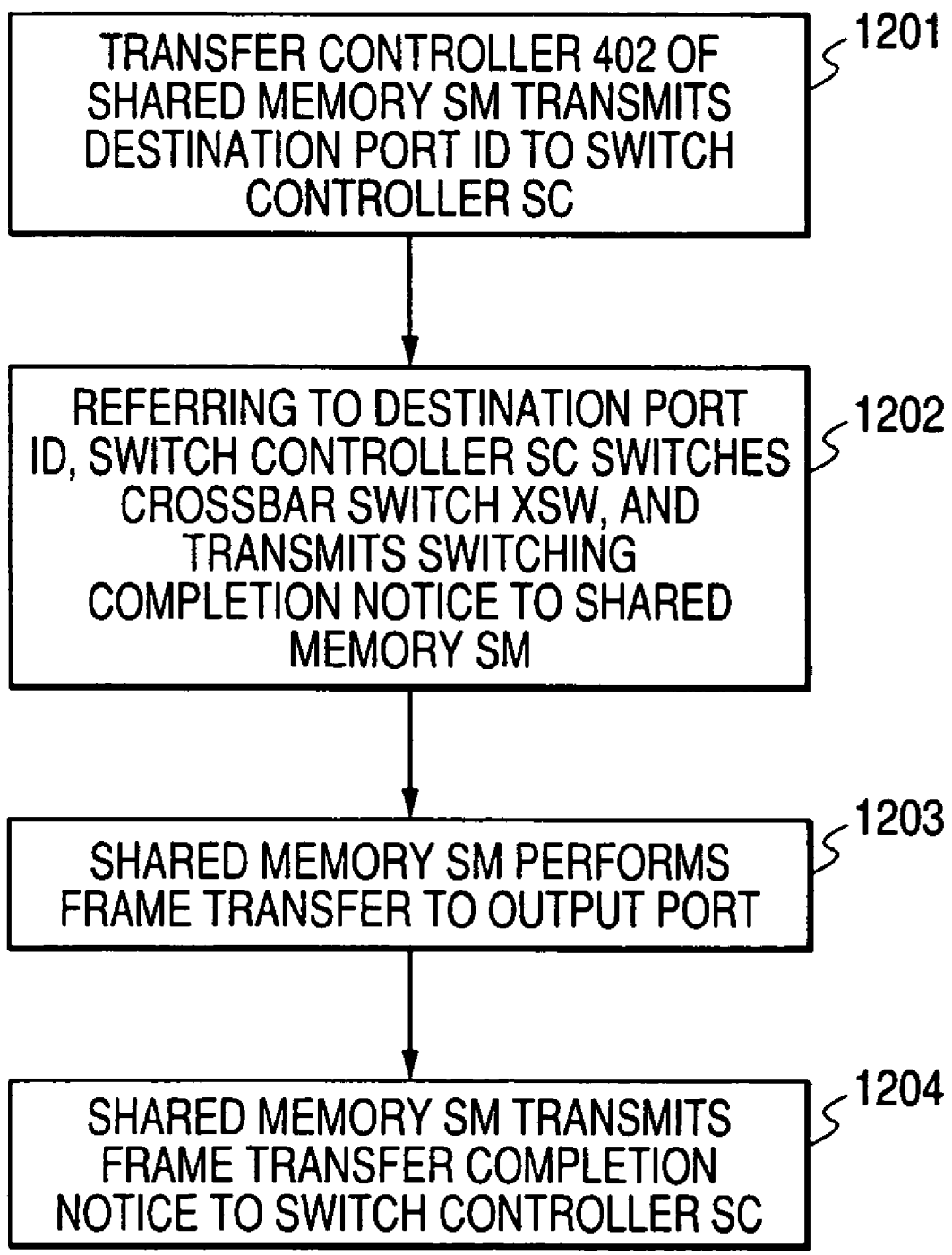
FIG. 12 is a diagram showing still another exemplary control flow of the switch of the embodiment.

Through the processing operation in the operation mode B shown in FIG. 11, the frame written into the shared memory SM is forwarded to the output port through the flow of FIG. 12.

To be specific, the transfer controller 402 of the shared memory SM analyzes the header of a frame to be transferred, and thus derived destination address information (in the case of Fibre Channel, destination port ID) is forwarded to the switch controller SC (1201). Based on thus provided destination address information, the switch controller SC switches the crossbar switch XSW. If any access conflict occurs between the output switch ports, arbitration is performed. Then, the switch controller SC forwards a switching completion notice of the crossbar switch XSW to the shared memory SM (1202). Thereafter, the shared memory SM performs frame transfer toward the output port (1203). Once such frame transfer is completed, the shared memory SM forwards a transfer completion notice to the switch controller SC as the last operation (1204). Herein, as long as no conflict is observed between the output ports, the flows of FIGS. 11 and 12 can be performed concurrently.

Figure 22:
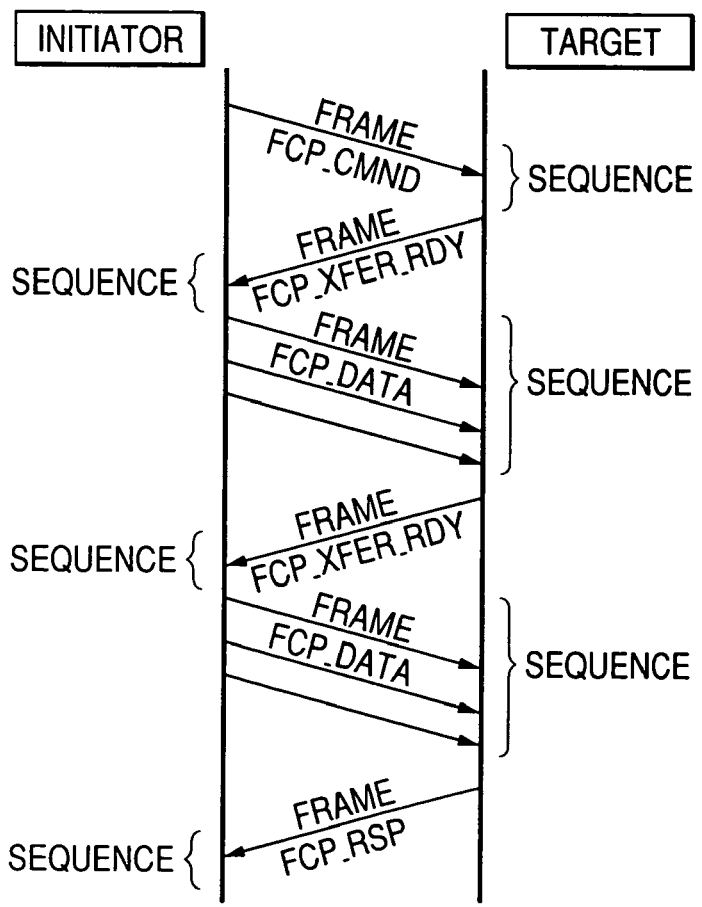
FIG. 22 is a diagram showing an exemplary case of Fibre Channel exchange (writing).

In the flow of FIG. 11, every frame included in the exchange format is set to the operation mode B. As shown in FIG. 22, due to commands and responses of shorter sequence, the buffer memory of the port will not resultantly overflow. Here, as an exemplary case of effectively using the shared memory in the flow of FIG. 13, only a frame(s) included in the data transfer sequence is set to the operation mode B.

Figure 13:
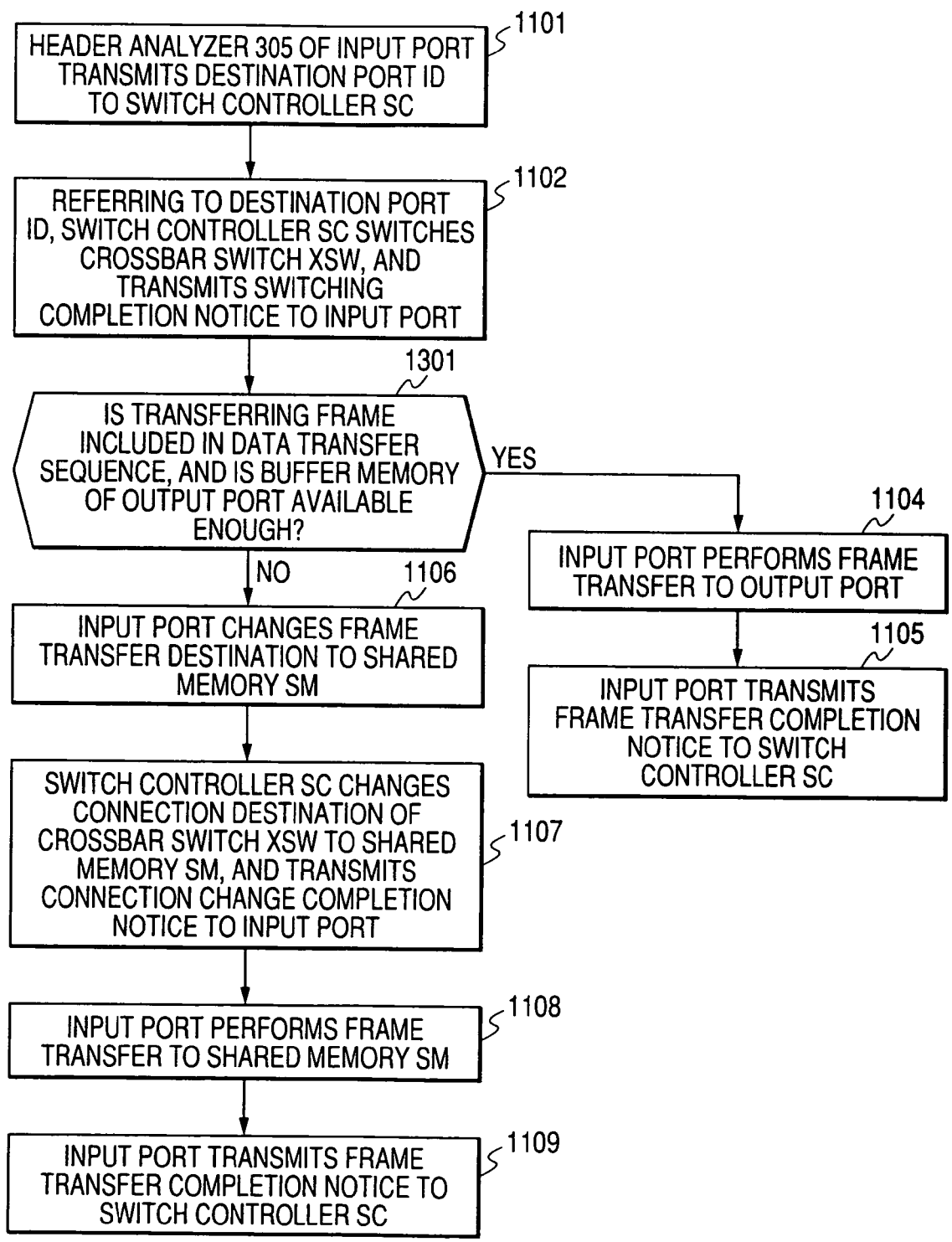
FIG. 13 is a diagram showing an exemplary control flow of another exemplary switch.

In step 1301 of FIG. 13, the header analyzer 304 of the input port checks whether or not the frame to be transferred is included in the data transfer sequence, and the relationship with the buffer memory of the output port.

FIG. 18 shows the structure of the frame included in the data transfer sequence. Herein, checking a field 1801 will tell whether the frame to be transferred is included in the data transfer sequence. In FIG. 13, any other steps are the same as those of FIG. 11.

Figure 14:
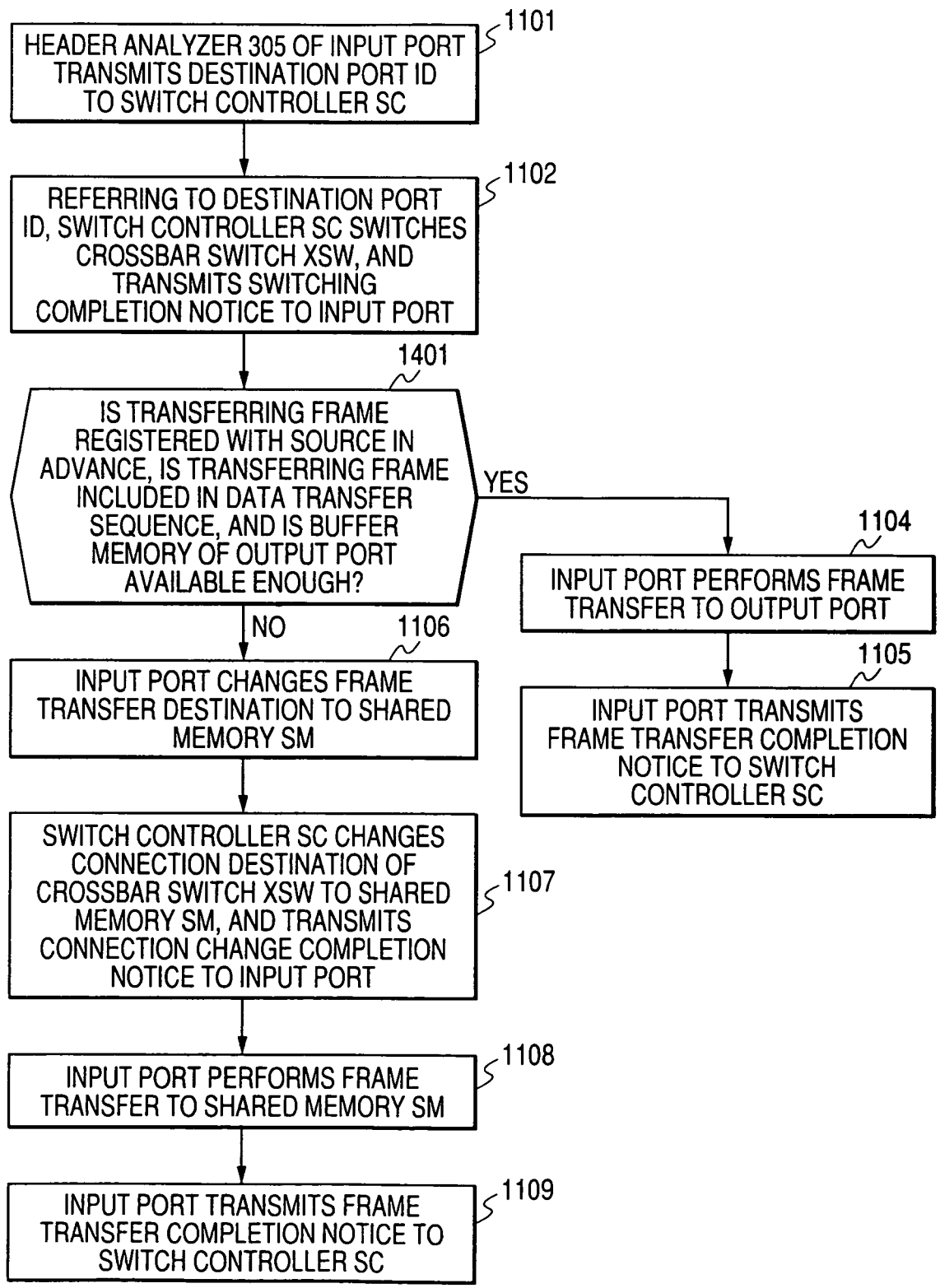
FIG. 14 is a diagram showing an exemplary control flow of still another exemplary switch.

FIGS. 11 and 13 both show an exemplary flow of the case where every frame input port is set to the operation mode B. FIG. 14 shows another exemplary operation flow.

FIG. 14 shows a flow for determining the operation mode by checking source address information of the frame on a port basis. In this example, the ports of the switch are registered in accordance with source address information for comparison purpose. In detail, the port ID of the disk adapter in the disk controller is provided from the service processor SVP to the switch for registration into the ports.

In step 1401, a comparison is made between the source information of the frame to be transferred and the registered port ID of the disk adapter. When the comparison result tells a match, and when the capacity availability of the buffer of the destination port is a predetermined value or lower, the frame is transferred to the shared memory SM. Here, other steps of FIG. 14 are the same as those of FIG. 11.

As such, by controlling the operation mode B using the source information for every frame, there is no more need to know in advance which port of the switch is supposed to be connected to the disk controller DKC. Thereby, the flexibility of switch connection topology can be increased. What is more, even if switch connection is established for a plurality of stages, there only needs to notify every switch of a port ID of the disk controller. As such, compared with the examples of FIGS. 11 and 13 requiring to check every switch connection relationship, it is considerably easy for management.

FIG. 17 shows the structure of a command transfer frame. The source information of a frame to be transferred can be easily known by examining a field 1701, for example.

Figure 15:
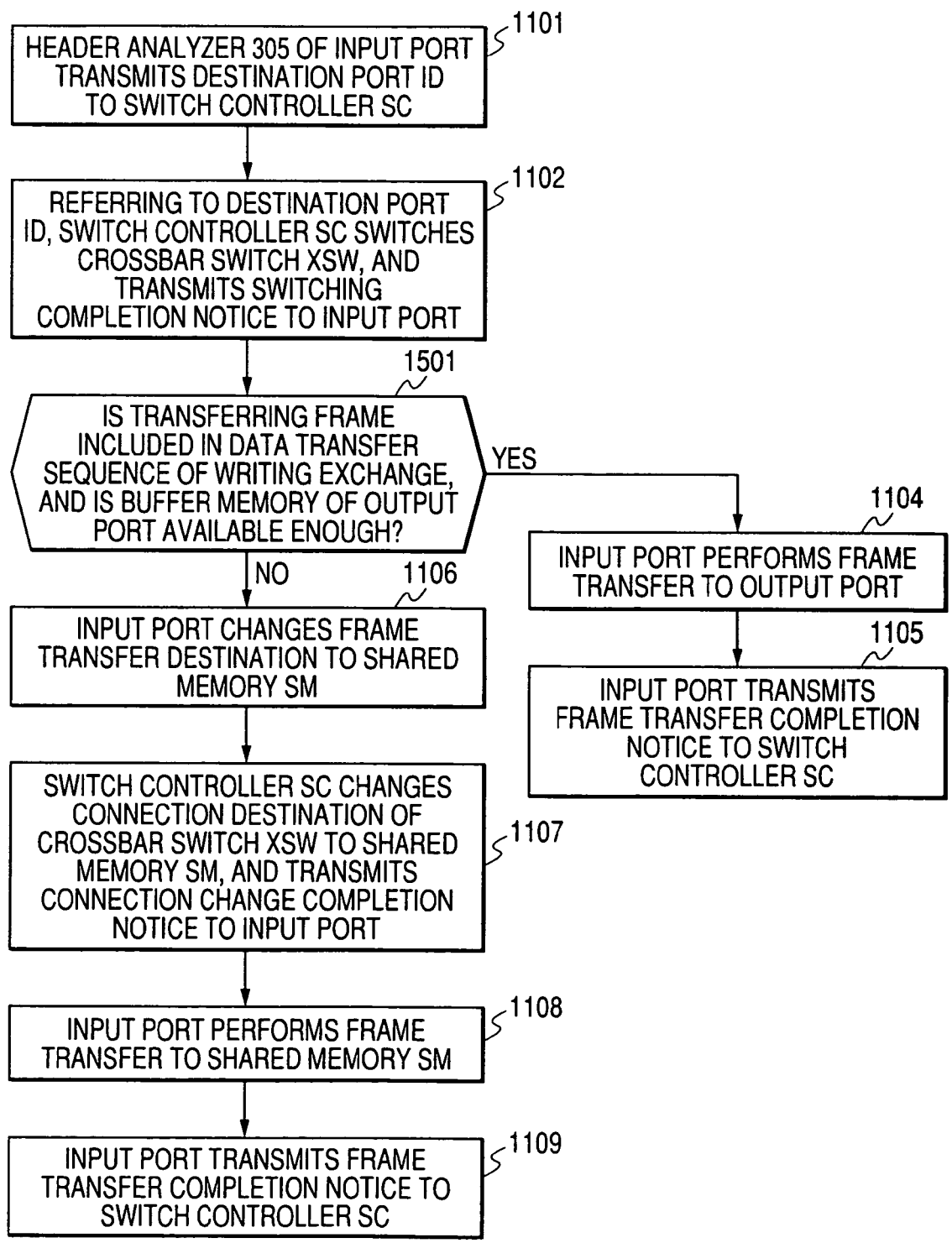
FIG. 15 is a diagram showing an exemplary control flow of still another exemplary switch.

FIG. 15 shows still another example, showing a control flowchart of the operation mode B not requiring input of the port ID of the disk controller similarly to FIG. 14.

In step 1501, the header of a frame to be transferred is checked whether or not the frame is included in the writing exchange format, and if included, whether or not the frame is included in the data transfer sequence. When the frame is included in the data transfer sequence of the writing exchange format, and when the capacity availability of the buffer of the destination port is a predetermined value or lower, the frame is transferred to the shared memory SM. Herein, other steps of FIG. 15 are the same as those of FIG. 11.

Figures 19, 20:
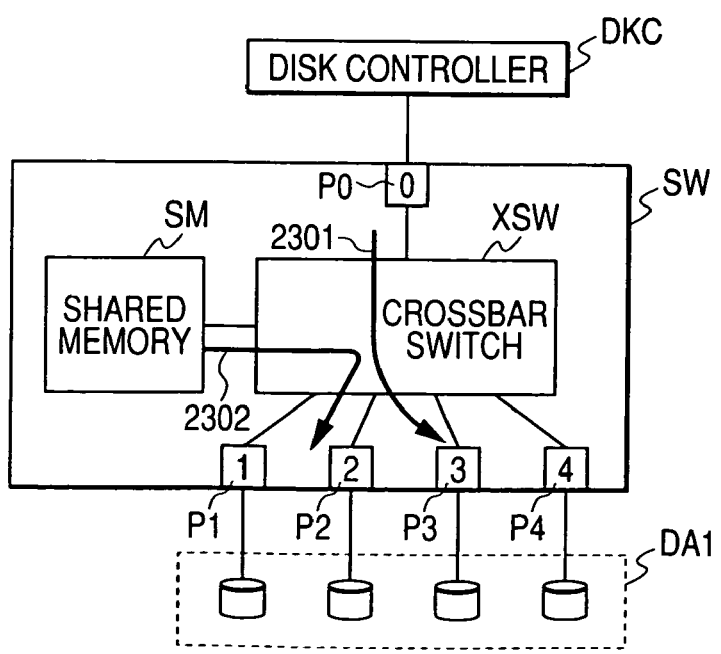
FIG. 19 is a diagram showing an exemplary exchange management table.
FIG. 20 is a diagram showing an exemplary operation of the switch of the embodiment.
Figure 21:
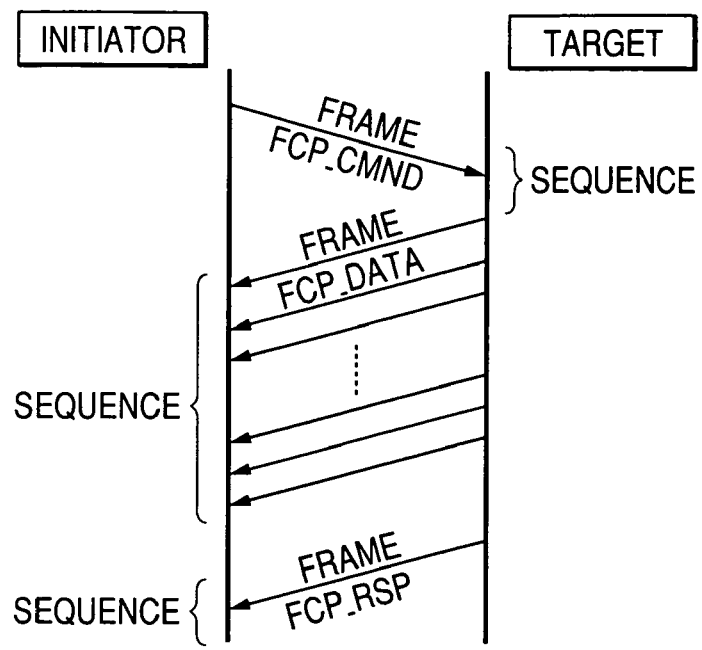
FIG. 21 is a diagram showing an exemplary case of Fibre Channel exchange (reading)

To make such a determination in step 1501, there requires a table including such an exchange ID 1901 as shown in FIG. 19 for every port.

Figure 16:
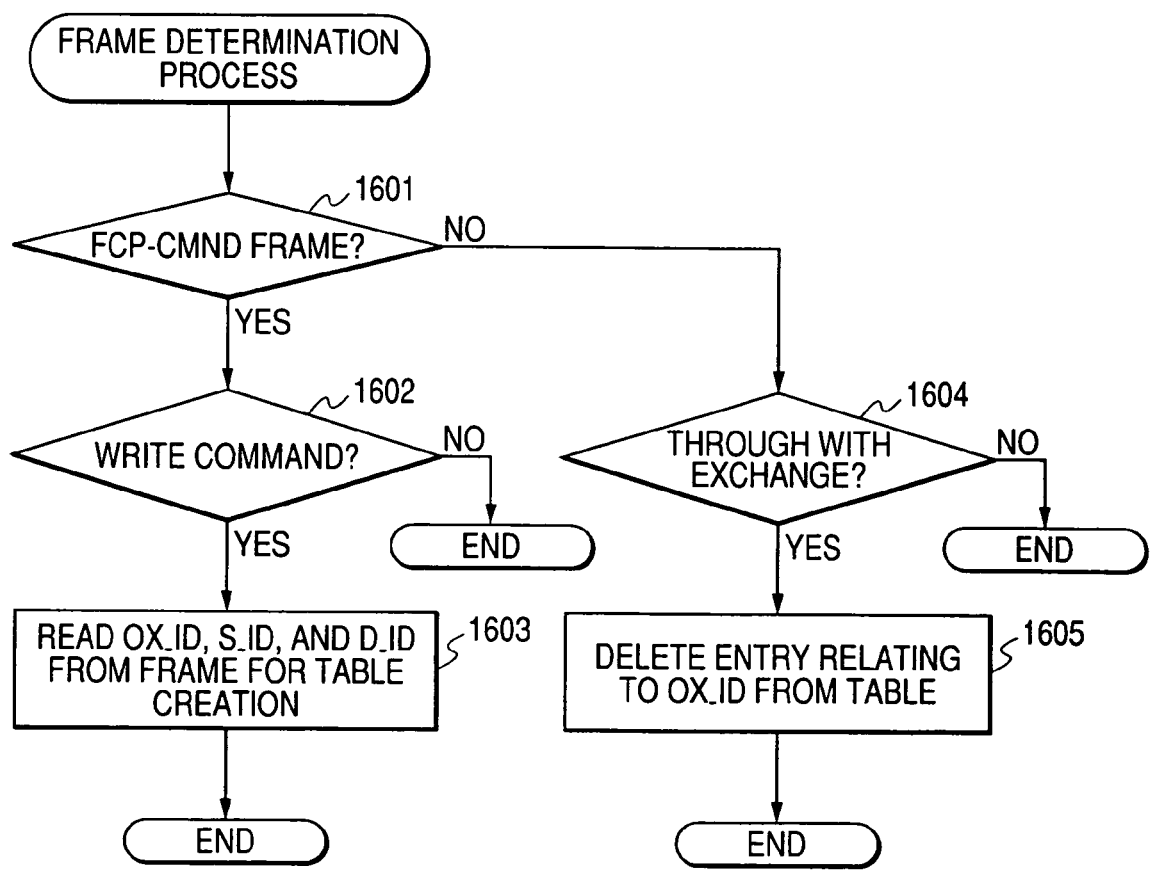
FIG. 16 is a diagram showing still another exemplary control flow of the switch of the embodiment.

FIG. 16 shows a flow for creating such a table of FIG. 19.

First of all, a determination is made whether the transferring frame is a command frame FCP_CMND (1601). This determination is easily made by checking a field 1702 of FIG. 17. When the check result tells that the frame is a command frame, the frame is then checked whether or not being a writing command (1602). This determination is easily made by checking a field 1704 of FIG. 17. When the check result tells that the frame is a writing command, the procedure goes to step 1603. Then, from a field 1703 of FIG. 17, an exchange ID (OX_ID) is extracted for registration into the table of FIG. 19 (1603).

On the other hand, when the check result in step 1601 tells that the transferring frame is not a command frame, exchange completion requirements are checked (1604). By checking an F_CTL field in the frame, e.g., a field 1802 of FIG. 18, it is easy to know whether the exchange will be end. As the last operation, when the exchange is completed, any entry relating to thus completed exchange is responsively deleted from the table of FIG. 19 (1605).

As described in the foregoing, according to the switch of the present embodiment, shared memory is used as buffer memory of a writing frame. Accordingly, compared with shared memory used for both a reading frame and a writing frame, the buffer effects can be effectively achieved even if the shared memory is not sufficient in capacity. Even if compared with the case of providing buffer memory of a large capacity for every port, the cost will be much lower.

In the above, exemplified is the Fibre Channel as a data transfer method to describe a switch for connecting a disk controller and a disk array in a storage device. This is surely not restrictive, and any other data transfer methods for storage devices, e.g., Expander of SAS (Serial Attached SCSI) are applicable.

Further, according to the above embodiment, a crossbar switch is performing path change through selection between first and second modes in accordance with the capacity availability of buffer memory. This is surely not restrictive, and as long as contributable to enhance the throughput between the disk controller and the disk array, any factors other than the capacity availability of the buffer memory can be used as a reference for path change through selection between the first and second modes to perform data transfer with thus changed path. In such a case, for example, selection either the first or second mode is made based on a command coming from a controller for monitoring or analyzing the factors.

According to the present invention, usage of shared memory is dependent on the capacity availability of buffer memory in a data transfer switch for storing transfer data. With such a structure, the writing throughput of the data can be enhanced in the storage device.

What we claim:

1. A switch for transferring data through a connection between a disk controller and a disk array, the switch comprising:
   a plurality of ports including an input port and an output port;
   a buffer memory provided for each of the plurality of ports of the switch for temporarily storing data to be transferred between the disk controller and the disk array;
   a crossbar switch for setting a path for data transfer through a connection with any of the plurality of ports; and
   a shared memory for storing data to be transferred through a connection with the crossbar switch, including a controller in the shared memory for monitoring a capacity availability of the buffer memory provided for the output port to which a frame is to be transferred, wherein
   when a monitoring result shows that the capacity availability of the buffer memory of the output port is exceeding a predetermined value, the controller sets the crossbar switch path in accordance with destination information in the frame so that the frame is transferred from the input port to the buffer memory of the output port via the crossbar switch and not via the shared memory, and
   wherein
   the controller determines whether an input port inputting the frame is a predetermined port,
   when the controller determines that the input port inputting the frame is not the predetermined port, the controller sets the crossbar switch path in accordance with the destination information in the frame so that the frame is transferred from the input port to the buffer memory of the output port via the crossbar switch and not via the shared memory, and
   when the controller determines that the input port inputting the frame is the predetermined port, and when a monitoring result shows that the capacity availability of the buffer memory of the output port is the predetermined value or lower, the controller writes the frame from the input port to the shared memory via the crossbar switch, and sets the crossbar switch path in accordance with the destination information in the frame to permit the frame to be transferred from the shared memory to the output port via the crossbar switch.

2. The switch according to claim 1, wherein
   as for the predetermined port, the controller uses a determination factor of whether a connection is established between the disk controller and the switch to which the port belongs.

3. A switch for transferring data through a connection between a disk controller and a disk array, the switch comprising:
   a plurality of ports including an input port and an output port;
   a buffer memory provided for each of the plurality of ports of the switch for temporarily storing data to be transferred between the disk controller and the disk array;
   a crossbar switch for setting a path for data transfer through a connection with any of the plurality of ports; and
   a shared memory for storing data to be transferred through a connection with the crossbar switch, including a controller in the shared memory for monitoring a capacity availability of the buffer memory provided for the output port to which a frame is to be transferred, wherein
   when a monitoring result shows that the capacity availability of the buffer memory of the output port is exceeding a predetermined value, the controller sets the crossbar switch path in accordance with destination information in the frame so that the frame is transferred from the input port to the buffer memory of the output port via the crossbar switch and not via the shared memory,
   the controller further makes an identification of source information included in the frame, and in accordance with an identification result of the source information and the monitoring result, when the capacity availability of the buffer memory of the output port is the predetermined value or lower and when the source information is predetermined source information, the controller writes the frame from the input port to the shared memory via the crossbar switch, and sets the crossbar switch path in accordance with the destination information in the frame to permit the frame to be transferred from the shared memory to the output port via the crossbar switch, and when the source information is not the predetermined source information, the controller sets the crossbar switch path in accordance with the destination information in the frame so that the frame is transferred from the input port to the buffer memory of the output port via the crossbar switch and not via the shared memory.

4. The switch according to claim 3, wherein as for the predetermined source information, the controller uses a determination factor of whether the information is port identification information of the disk controller.

5. A switch for transferring data through a connection between a disk controller and a disk array, the switch comprising:

a plurality of ports including an input port and an output port;

a buffer memory provided for each of the plurality of ports of the switch for temporarily storing data to be transferred between the disk controller and the disk array;

a crossbar switch for setting a path for data transfer through a connection with any of the plurality of ports;

a shared memory for storing data to be transferred through a connection with the crossbar switch, including a controller in the shared memory for monitoring a capacity availability of the buffer memory provided for the output port to which a frame is to be transferred, wherein when a monitoring result shows that the capacity availability of the buffer memory of the output port is exceeding a predetermined value, the controller sets the crossbar switch path in accordance with destination information in the frame so that the frame is transferred from the input port to the buffer memory of the output port via the crossbar switch and not via the shared memory, the controller further makes a determination as to whether a command in an exchanae format including the frame is a predetermined command, and in accordance with a determination result of the command and the monitoring result of the buffer memory of the output port, when the capacity availability of the buffer memory of the output port is the predetermined value or lower and when the command included in the exchange format is the predetermined command, the controller writes the frame from the input port to the shared memory via the crossbar switch, and sets the crossbar switch path in accordance with the destination information in the frame to permit the frame to be transferred from the shared memory to the output port via the crossbar switch, and when the command included in the exchange format is not the predetermined command, the controller sets the crossbar switch path in accordance with the destination information in the frame so that the frame is transferred from the input port to the output port via the crossbar switch and not via the shared memory.

6. The switch according to claim 5, wherein as for the predetermined command, the controller uses a determination factor of whether the command is a writing command.

7. A data transfer control method for performing data transfer between a disk controller and a disk array using a switch having a crossbar switch and a shared memory, the method comprising the steps of:

monitoring a capacity availability of the buffer memory of an output port for a frame to be transferred between the disk controller and the disk array;

when a monitoring result shows that the capacity availability of the buffer memory of the output port is exceeding a predetermined value, setting a crossbar switch path in accordance with destination information in the frame and transferring the frame from an input port to the buffer memory of the output port via the crossbar switch and not via the shared memory;

determining whether an input port inputting the frame to be transferred is a predetermined port, and when the capacity availability of the buffer memory of the output port is the predetermined value or lower and when the input port is the predetermined port, writing the frame from the input port to the shared memory via the crossbar switch, setting the crossbar switch path in accordance with the destination information in the frame, and reading the frame from the shared memory to the output port via the crossbar switch when the capacity availability of the buffer memory of the output port changes to be exceeding the predetermined value;

wherein when the input port is not the predetermined port, the crossbar switch performs path setting in accordance with the destination information in the frame so that the frame is transferred from the input port to the output port via the crossbar switch and not via the shared memory.

8. A data transfer control method for performing data transfer between a disk controller and a disk array using a switch having a crossbar switch and a shared memory, the method comprising the steps of:

monitoring a capacity availability of the buffer memory of an output port for a frame to be transferred between the disk controller and the disk array;

making an identification of source information included in the frame;

when a monitoring result shows that the capacity availability of the buffer memory of the output port is exceeding a predetermined value, setting a crossbar switch path in accordance with destination information in the frame and transferring the frame from an input port to the buffer memory of the output port via the crossbar switch and not via the shared memory; and when the capacity availability of the buffer memory of the output port is the predetermined value or lower and when the source information is predetermined source information, writing the frame from the input port to the shared memory via the crossbar switch, setting the crossbar switch path in accordance with the destination information in the frame, and reading the frame from the shared memory to the output port via the crossbar switch when the capacity availability of the buffer memory of the output port changes to be exceeding the predetermined value;

wherein when the source information is not the predetermined source information, the crossbar switch performs path setting in accordance with the destination information in the frame so that the frame is transferred from the input port to the output port via the crossbar switch and not via the shared memory.

9. A data transfer control method for performing data transfer between a disk controller and a disk array using a switch having a crossbar switch and a shared memory, the method comprising the steps of:

monitoring a capacity availability of the buffer memory of an output port for a frame to be transferred between the disk controller and the disk array;

making a determination as to whether a command in an exchange format including the frame is a predetermined command;

when a monitoring result shows that the capacity availability of the buffer memory of the output port is exceeding a predetermined value, setting a crossbar switch path in accordance with destination information in the frame and transferring the frame from an input port to the buffer memory of the output port via the crossbar switch and not via the shared memory; and when the command included in the exchange format is the predetermined command and when the capacity availability of the buffer memory of the output port is the predetermined value or lower, writing the frame from the input port to the shared memory via the crossbar switch, setting the crossbar switch path in accordance with the destination information in the frame, and reading the frame from the shared memory to the output port via the crossbar switch when the capacity availability of the buffer memory of the output port changes to be exceeding the predetermined value;

wherein when the command included in the exchange format is not the predetermined command, the crossbar switch performs path setting in accordance with the destination information in the frame so that the frame is transferred from the input port to the output port via the crossbar switch and not via the shared memory.

10. The data transfer control method according to claim 9, wherein the determination step determines whether the command included in the exchange format is a writing command.

11. The data transfer control method according to claim 10, wherein the frame is included in a data transfer sequence.

12. A storage system comprising:

a disk array for data storage;

a disk controller for controlling data reading and writing from/to the disk array; and a switch for establishing a connection between the disk controller and the disk array, wherein the switch comprises:

a plurality of ports including an input port and an output port;

a buffer memory provided for each of the plurality of ports of the switch for temporarily storing data to be transferred between the disk controller and the disk array;

a crossbar switch for setting a path for data transfer through a connection with any of the plurality of ports; and a shared memory for storing data to be transferred through a connection with the crossbar switch, including a controller in the shared memory for monitoring a capacity availability of the buffer memory of the output port to which a frame is to be transferred, wherein:

when a monitoring result shows that the capacity availability of the buffer memory of the output port is exceeding a predetermined value, the controller sets the crossbar switch path in accordance with destination information in the frame to permit the frame to be transferred from the input port to the buffer memory of the output port via the crossbar switch and not via the shared memory, and when the capacity availability of the buffer memory of the output port is the predetermined value or lower and when the input port inputting the frame is a predetermined port, the controller writes the frame from the input port to the shared memory via the crossbar switch, and sets the crossbar switch path in accordance with the destination information in the frame so that the frame is transferred from the shared memory to the output port via the crossbar switch, wherein the controller determines whether the input port inputting the frame is the predetermined port, and when the input port inputting the frame is not the predetermined port, the controller sets the crossbar switch path in accordance with the destination information in the frame so that the frame is transferred from the input port to the buffer memory of the output port via the crossbar switch and not via the shared memory.

13. A storage system, comprising:

a plurality of storage devices;

a disk controller for controlling data reading and writing from/to the plurality of storage devices; and a switch for establishing a connection between the controller and the plurality of storage devices, wherein the switch comprises:

a plurality of ports including an input port and an output port;

a buffer memory provided for each of the plurality of ports for temporarily storing data to be transferred between the controller and the plurality of storage devices;

a crossbar switch for setting a path for data transfer through a connection with any of the plurality of ports;

a shared memory for storing the data through a connection with the crossbar switch; and a controller for monitoring a capacity availability of the buffer memory of the output port to which a frame is to be transferred, wherein the controller determines whether an input port inputting the frame is a port to be connected to the disk controller, when the input port inputting the frame is determined as not to be connected to the disk controller, or when the monitoring result shows that the capacity availability of the buffer memory of the output port is exceeding a predetermined value, the controller sets the crossbar switch path in accordance with destination information in the frame so that the frame is transferred from the input port to the buffer memory of the output port via the crossbar switch and not via the shared memory, and when the input port is determined to be a port to be connected to the disk controller, and when the capacity availability of the buffer memory of the output port is determined to be the predetermined value or lower, the controller writes the frame from the input port to the shared memory via the crossbar switch, and sets the crossbar switch path in accordance with the destination information in the frame to permit the frame to be transferred from the shared memory to the output port via the crossbar switch.

* * * * *